(12) United States Patent
Kim et al.

(10) Patent No.: US 9,565,665 B2
(45) Date of Patent: Feb. 7, 2017

(54) METHOD FOR RESOURCE ALLOCATION FOR DOWNLINK CONTROL CHANNEL IN WIRELESS COMMUNICATION SYSTEM AND APPARATUS THEREFOR

(71) Applicant: LG ELECTRONICS INC., Seoul (KR)

(72) Inventors: Myoungseob Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 14/370,692

(22) PCT Filed: Jan. 11, 2013

(86) PCT No.: PCT/KR2013/000244
§ 371 (c)(1),
(2) Date: Jul. 3, 2014

(87) PCT Pub. No.: WO2013/115502
PCT Pub. Date: Aug. 8, 2013

(65) Prior Publication Data
US 2014/0348103 A1 Nov. 27, 2014

Related U.S. Application Data

(60) Provisional application No. 61/591,997, filed on Jan. 30, 2012, provisional application No. 61/597,184, filed on Feb. 10, 2012.

(51) Int. Cl.
*H04W 72/04* (2009.01)
*H04L 5/00* (2006.01)

(52) U.S. Cl.
CPC .......... *H04W 72/042* (2013.01); *H04L 5/0053* (2013.01); *H04L 5/001* (2013.01);
(Continued)

(58) Field of Classification Search
CPC .......... H04W 72/042; H04W 72/0413; H04W 24/10; H04W 88/08; H04W 72/0406; H04W 28/18; H04W 72/0446; H04W 72/1289; H04L 5/0053; H04L 5/0044; H04L 5/001; H04L 5/0048
See application file for complete search history.

(56) References Cited

U.S. PATENT DOCUMENTS

2009/0168922 A1* 7/2009 Malladi ............... H04W 72/042
375/316
2010/0260124 A1 10/2010 Noshio et al.
(Continued)

FOREIGN PATENT DOCUMENTS

EP 2 207 270 A1 7/2010
KR 10-2009-0050132 A 5/2009
(Continued)

OTHER PUBLICATIONS

R1-112517, Discussion on ePDCCH Design Issues, Aug. 2011.*
(Continued)

*Primary Examiner* — Un C Cho
*Assistant Examiner* — Oussama Roudani
(74) *Attorney, Agent, or Firm* — Birch, Stewart, Kolasch & Birch, LLP

(57) ABSTRACT

Disclosed is a method for a base station to transmit a downlink control channel in a wireless communication system. Specifically, the method comprises the steps of: determining, on the basis of the number of usable resource elements in one pair of resource blocks, the size of a resource allocation unit for a downlink control channel and the number of resource allocation units within one pair of resource blocks; mapping the downlink control channel, from a preset number of resource block pairs, to the transmission resource on the basis of the determined resource allocation unit; and transmitting the downlink control chan- (Continued)

nel to a terminal, wherein the size of the resource allocation unit is defined by the number of resource elements and is varied according to the number of usable resource elements.

14 Claims, 19 Drawing Sheets

(52) U.S. Cl.
CPC .......... *H04L 5/0023* (2013.01); *H04L 5/0051* (2013.01); *H04L 5/0064* (2013.01); *H04L 5/0094* (2013.01); *H04W 72/0406* (2013.01)

(56) References Cited

U.S. PATENT DOCUMENTS

2011/0177833 A1  7/2011  Horiuchi et al.
2013/0010682 A1  1/2013  Kim et al.

FOREIGN PATENT DOCUMENTS

| KR | 10-2009-0074235 A | 7/2010 |
|---|---|---|
| KR | 10-2011-0114492 A | 10/2011 |
| WO | WO 2010/035497 A1 | 4/2010 |
| WO | WO 2011/159132 A2 | 12/2011 |

OTHER PUBLICATIONS

TS 36.211 V10.4.0, Physical Channels and Modulation (Release 10) , Dec. 2011.*
Samsung, "Search Space Design for DL Enhanced Control Channels", 3GPP TSG RAN WGI #67, Agenda Item 7.7.3, San Francisco, USA, Nov. 14-18, 2011, 3 pages, R1-114242.
Apple Inc., "On the Structure and Usage Scenarios of ePDCCH," 3GPP TSG RAN WG1, Meeting #67, R1-114300, San Francisco, USA, Nov. 14-18, 2011, pp. 1-9, XP-50562351A.
Panasonic, "Mapping of Physical Resources to R-PDCCH," 3GPP TSG RAN WG1 Meeting #63, R1-106088, Jacksonville, USA, Nov. 15-19, 2010, pp. 1-5, XP-50489575A.

* cited by examiner

FIG. 2
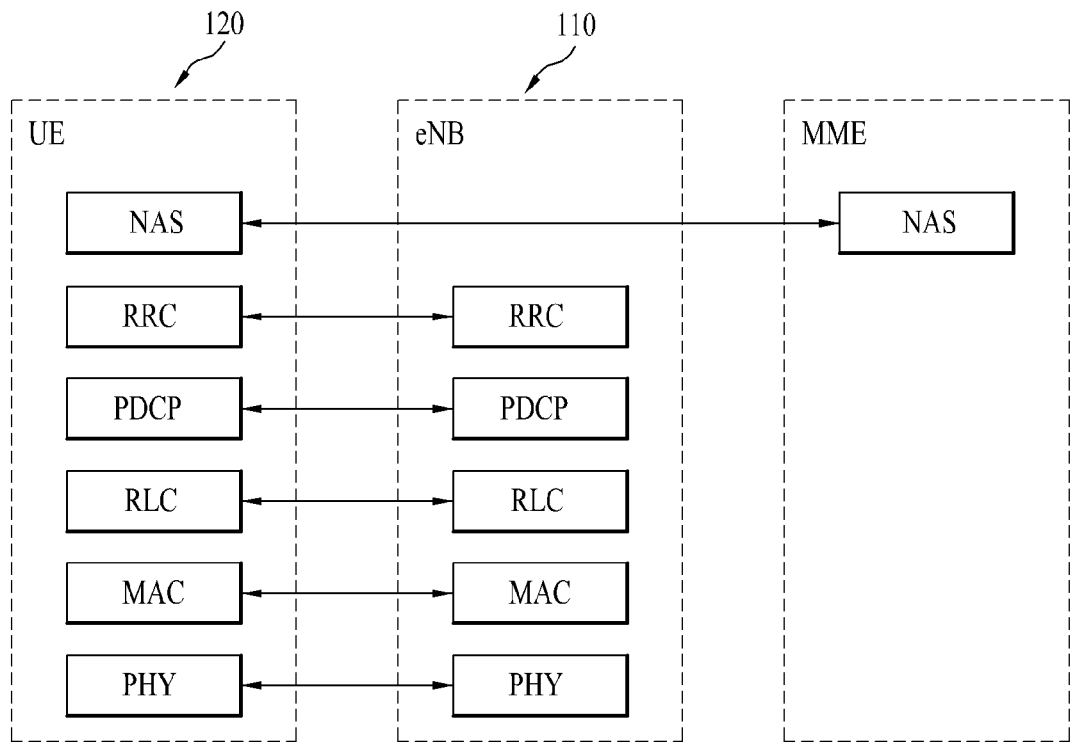
(a) Control-Plane Protocol Stack
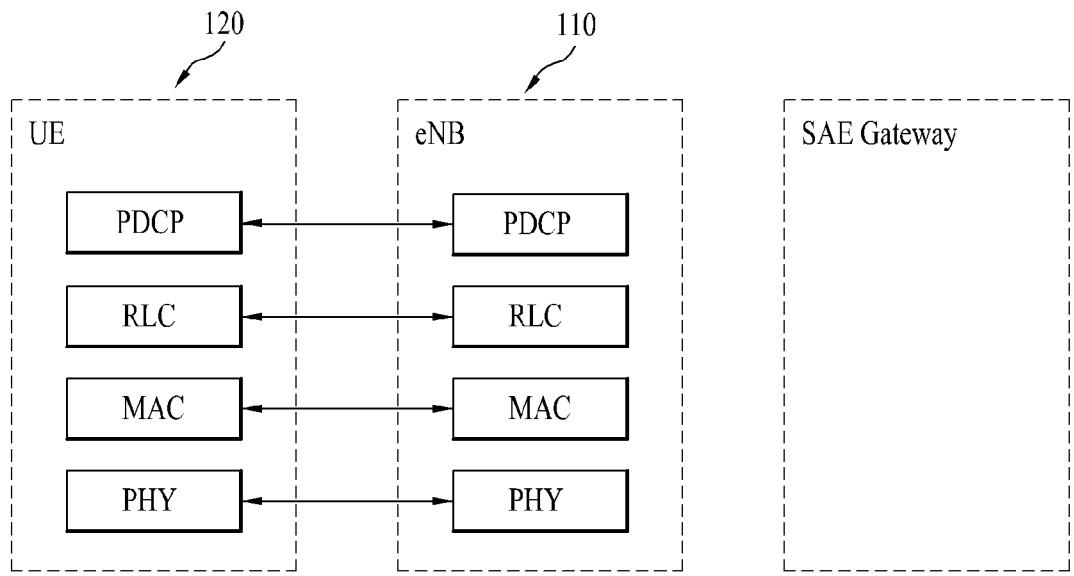
(b) User-Plane Protocol Stack FIG. 6
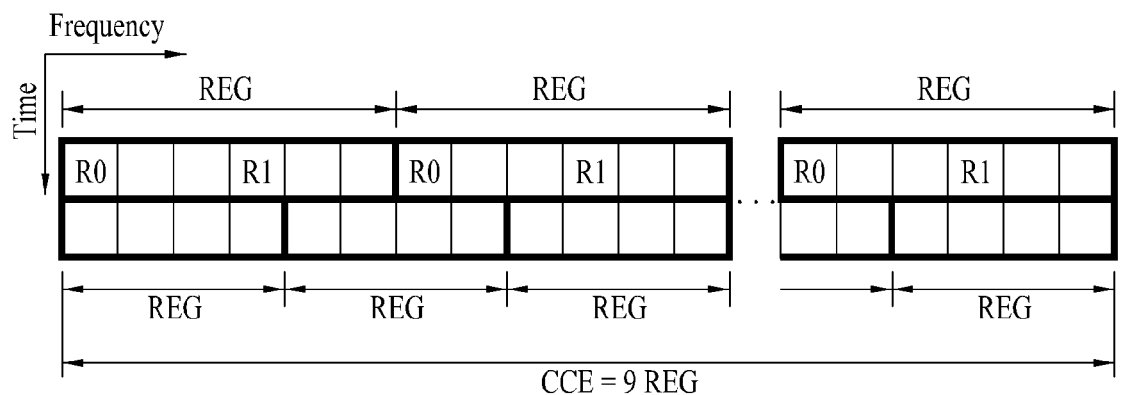
(a) 1TX or 2TX
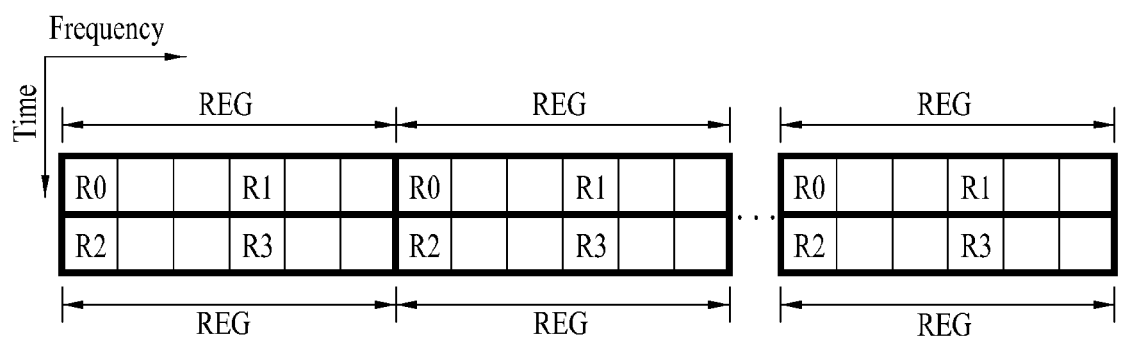
(b) 4 TX

FIG. 16
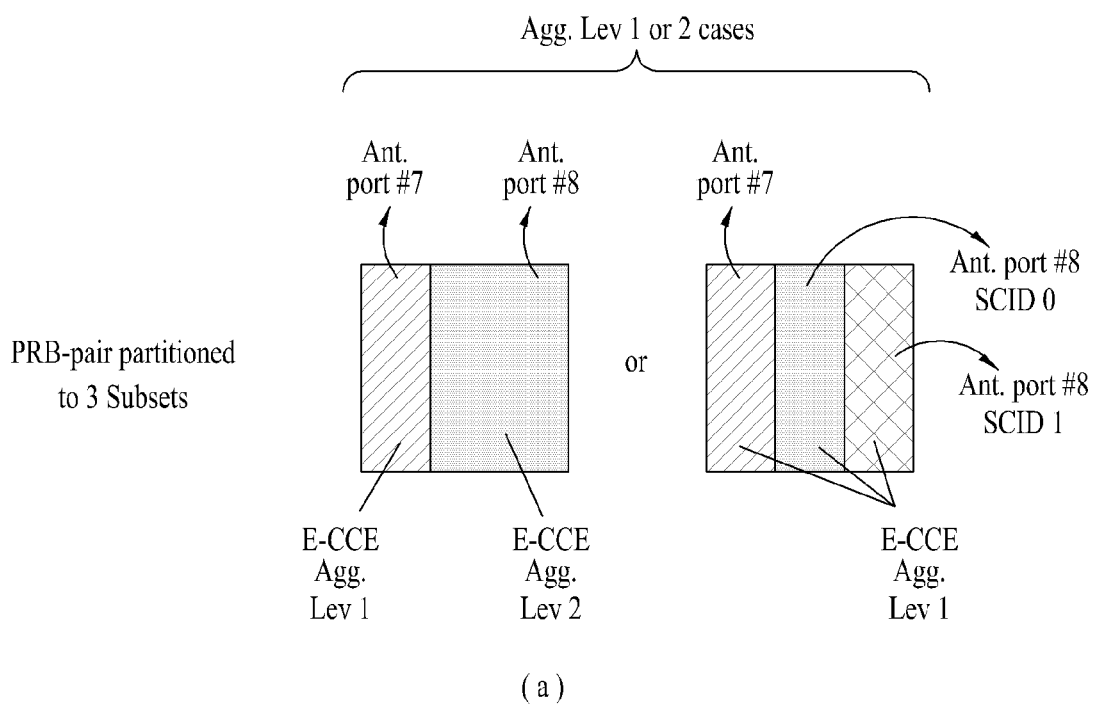
(a)
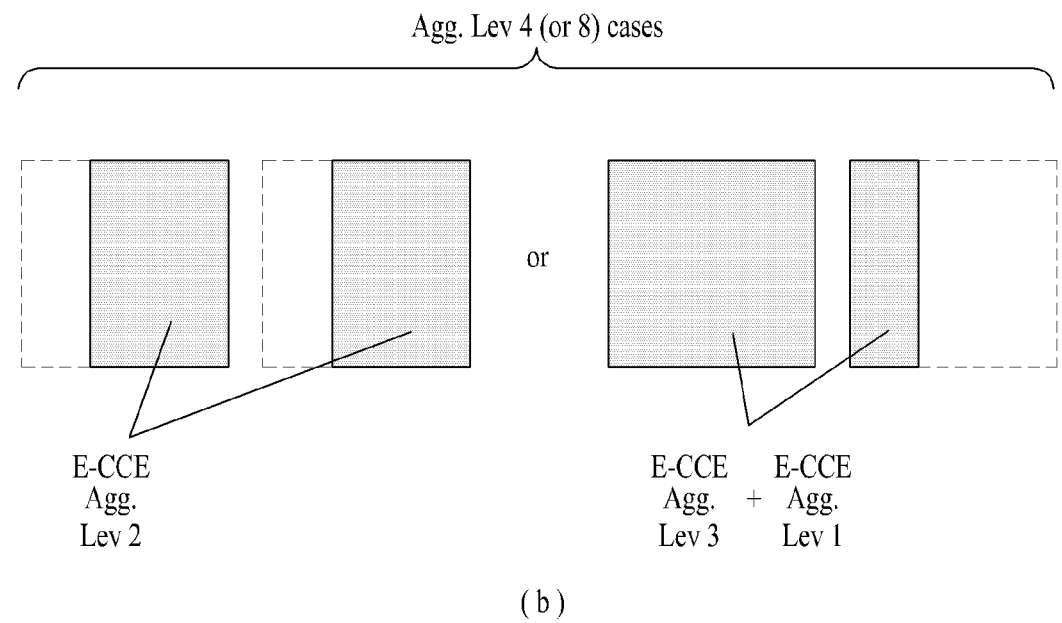
(b)

METHOD FOR RESOURCE ALLOCATION FOR DOWNLINK CONTROL CHANNEL IN WIRELESS COMMUNICATION SYSTEM AND APPARATUS THEREFOR

CROSS REFERENCE TO RELATED APPLICATIONS

This application is the National Phase of PCT International Application No. PCT/KR2013/000244, filed on Jan. 11, 2013, which claims priority under 35 U.S.C. 119(e) to U.S. Provisional Application No. 61/591,997, filed on Jan. 30, 2012 and 61/597,184, filed on Feb. 10, 2012, all of which are hereby expressly incorporated by reference into the present application.

FIELD OF THE INVENTION

The present invention relates to a wireless communication system and, most particularly, to a method for resource allocation for downlink control channel in a wireless communication system and an apparatus therefor.

BACKGROUND ART

As an example of a communication system to which the present invention may be applied, a 3GPP LTE ($3^{rd}$ Generation Partnership Project Long Term Evolution; hereinafter referred to as "LTE") communication system will now be broadly described.

FIG. 1 illustrates a general view of an E-UMTS network structure as an example of a communication system. Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG), which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.44, 3, 5, 10, 15, and 20 Mhz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon WCDMA. However, the demands and expectations of the users and the manufacturers and providers are growing continuously. Also, since other wireless access technologies are constantly being developed, the wireless communication technology is required to newly evolve in order to ensure competiveness in the future. Accordingly, characteristics, such as reduced cost for each bit, extended service availability, usage of a flexible frequency band, simple structure and open interface, and adequate power consumption of the user equipment are being requested.

DETAILED DESCRIPTION OF THE INVENTION

Technical Objects

Based upon the above-described discussion, a method for resource allocation for downlink control channel in a wireless communication system and an apparatus therefor will hereinafter be proposed.

Technical Solutions

According to an aspect of the present invention, a method of a base station for transmitting a downlink control channel in a wireless communication system includes the steps of deciding a size of a resource allocation unit for the downlink control channel and a number of resource allocation units within one resource block pair, based upon a number of usable resource elements in a resource block pair; mapping the downlink control channel to a transmission resource within a predetermined number of resource block pairs, in accordance with the decided resource allocation units; and transmitting the downlink control channel to the user equipment, wherein the size of the resource allocation unit is defined by a number of resource elements, and wherein the size of the resource allocation unit varies in accordance with the number of usable resource elements.

Herein, a maximum value and a minimum value of the size of the resource allocation unit respectively vary in accordance with the number of resource allocation units being included in the one resource block pair. And, preferably, the maximum value may be equal to or less than 46, and the minimum value may be equal to or greater than 23.

Additionally, unused resource elements not included in the resource allocation unit are equally distributed to the predetermined number of resource block pairs. More specifically, when a number of unused resource elements is equal to R, a symbol index f(R,n) having an $n^{th}$ unused resource element located thereto may be decided by Equation A shown below.

$$f(R, n) = \left(n_{RB} + \text{round}\left(\frac{N_{Sym}}{R}\right) \cdot (n-1)\right) \bmod N_{sym} \quad \langle \text{Equation A} \rangle$$

(Herein, $n_{RB}$ indicates an index of a PRB-pair, and $N_{Sym}$ indicates a number of symbols for the downlink control channel.)

Additionally, the one resource block pair includes at least one unusable resource element, and the unusable resource element includes resource elements for a reference signal and resource elements being included in a control region of one subframe.

More preferably, when a plurality of resource allocation units is included in the one resource block pair, the size of each resource allocation unit is identical or has a difference equivalent to one resource element.

Meanwhile, according to another aspect of the present invention, a base station device in a wireless communication system includes a processor configured to decide a size of a resource allocation unit for the downlink control channel and a number of resource allocation units within one resource block pair, based upon a number of usable resource elements in a resource block pair, and to map the downlink control channel to a transmission resource within a predetermined number of resource block pairs, in accordance with the decided resource allocation units; and a wireless communication module configured to transmit the downlink control channel to the user equipment, wherein the size of the resource allocation unit is defined by a number of resource elements, and wherein the size of the resource allocation unit varies in accordance with the number of usable resource elements.

Advantageous Effects

According to the exemplary embodiment of the present invention, a downlink control channel may efficiently allocate resources.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

FIG. 2 illustrates a Control Plane structure and a User Plane structure of a Radio Interface Protocol between a user equipment and the E-UTRAN based upon the 3GPP radio access network standard.

FIG. 6 illustrates a resource unit being used for configuring a downlink control channel in the LTE system.

FIG. 16 illustrates an exemplary DCI allocation method in a case when a PRB-pair partitioned to 3 subsets.

BEST MODE FOR CARRYING OUT THE PRESENT INVENTION

Figure 1:
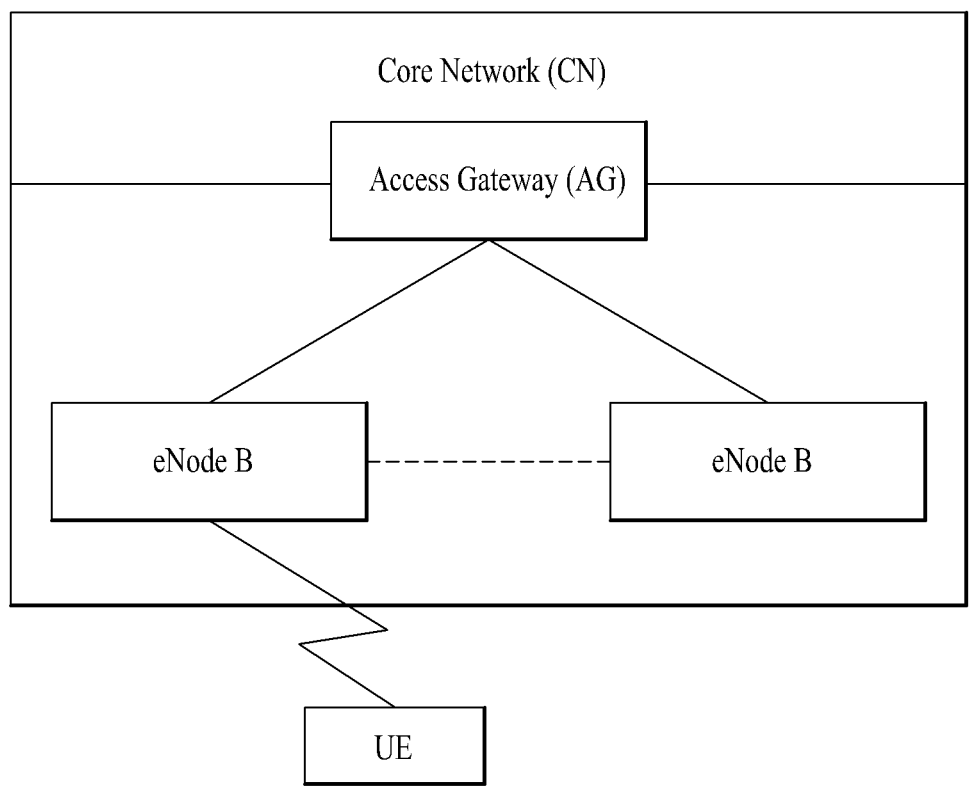
FIG. 1 illustrates a general view of an E-UMTS network structure as an example of a wireless communication system.

Hereinafter, reference will now be made in detail to the preferred embodiments of the present invention, examples of which are illustrated in the accompanying drawings. The detailed description of the present invention is provided to facilitate the understanding of the configuration, operation, and other characteristics of the present invention. The following embodiments of the present invention correspond to examples wherein the technical features of the present invention are applied in the 3GPP system.

The description of the present invention will describe the embodiments of the present invention by using the LTE system and the LTE-A system. However, this is merely exemplary, and, therefore, the present invention may be applied to any other corresponding to the above-described definition. Also, the description of the present invention will also describe the embodiments of the present invention based upon an FDD method. However, this is also merely exemplary, and, therefore, the present invention may also be easily modified and applied to an H-FDD method or a TDD method.

FIG. 2 illustrates a Control Plane structure and a User Plane structure of a Radio Interface Protocol between a user equipment and the E-UTRAN based upon the 3GPP radio access network standard. A control plane refers to a path through which control messages are transmitted. Herein, the control messages are used by the User Equipment (UE) and network in order to manage a unit. And, a user plane refers to a path through which data generated from an application layer are transmitted. Such data may include audio data or Internet packet data, and so on.

A first layer, which corresponds to a physical layer, uses a physical channel to provide an Information Transfer Service to a higher layer. The physical layer is connected to a Medium Access Control layer, which corresponds to a higher layer, through a Transport Channel. And, herein, data is transported between the Medium Access Control layer and the physical layer through the Transport Channel (Trans Antenna Port Channel). In a data transmission between a physical layer of the transmitting end and a physical layer of the receiving end, data are transported between the physical layers through a physical channel. Herein, the physical layer uses time and frequency as radio resource. More specifically, in a downlink, the physical channel is modulated by using an OFDMA (Orthogonal Frequency Division Multiple Access) scheme, and, in an uplink, the physical channel is modulated by using an SC-FDMA (Single Carrier Frequency Division Multiple Access) scheme.

A Medium Access Control (MAC) layer of a second layer provides services to a Radio Link Control (RLC) layer, which corresponds to higher layer, through a logical channel. The Radio Link Control (RLC) layer of the second layer supports the transmission of reliable data. The function of the RLC layer may also be realized by a functional block within the MAC. A PDCP (Packet Data Convergence Protocol) layer of the second layer performs a header compression function, which can reduce unnecessary control information in order to efficiently transmit IP packets, such as IPv4 or IPv6, in a wireless (or radio) interface having a narrow bandwidth.

A radio resource control (RRC) layer which is positioned in a lowermost portion of a third layer is defined only in the control plane. And, in relation with the configuration, re-configuration, and release of radio bearers (RBs), the RRC layer performs the role of controlling the logical channels, the transmission channels, and the physical channels. The Radio Bearer refers to a service that is provided by the second layer in order to deliver (or transport) data between the UE and the network. In order to do so, the RRC layers of the UE and the network exchanges RRC messages to and from one another. If an RRC connection exists between the RRC layer of the UE and the RRC layer of the network, the user equipment is in an RRC Connected Mode. And, if not, the user equipment is in an RRC Idle Mode. An NAS (Non-Access Stratum) layer, which is located above the RRC layer performs the roles of Session Management and Mobility Management.

One cell that configures a base station (eNB) is set to one of bandwidths of 1.4, 3, 5, 10, 15, and 20 Mhz, thereby providing a downlink or uplink transport service to several user equipments. Different cells may be set to provide different bandwidths.

In the network, downlink transmission channels that transmit data to the UE include a BCH (Broadcast Channel), which transmits system information, a PCH (Paging Channel), which transmits paging messages, and a downlink SCH (Shared Channel), which transmits information other than the system information, such as user traffic or control messages. In case of traffic information or control messages of a downlink multicast or broadcast service, the corresponding data may be transmitted through a downlink SCH or may also be transmitted through a separate downlink MCH (Multicast Channel). Meanwhile, uplink transmission channels that transmit data from the UE to the network include a RACH (Random Access Channel), which transmits initial control messages, and an uplink SCH (Shared Channel), which transmits information other than the system information, such as user traffic or control messages. Logical Channels being in a level higher than the transmission channel and being mapped to the transmission channel include a BCCH (Broadcast Channel), a PCCH (Paging Control Channel), a CCCH (Common Control Channel), an MCCH (Multicast Control Channel), an MTCH (Multicast Traffic Channel), and so on.

Figure 3:
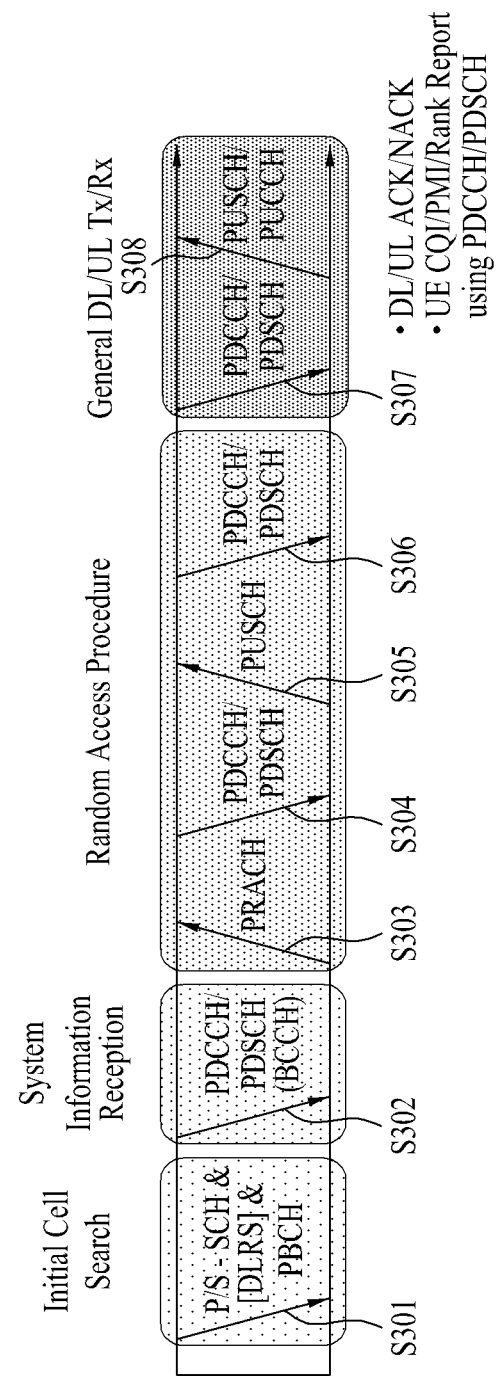
FIG. 3 illustrates physical channels that are used in the 3GPP system and a general method for transmitting signals using such physical channels.

FIG. 3 illustrates physical channels that are used in the 3GPP system and a general method for transmitting signals using such physical channels.

The user equipment performs initial cell search such as synchronization with the base station, when it newly enters a cell or when the power is turned on (S301). In order to do so, the user equipment establishes synchronization with the base station by receiving a Primary Synchronization Channel (P-SCH) and a Secondary Synchronization Channel (S-SCH) from the base station, and then acquires information such as cell ID, and so on. Thereafter, the user equipment may acquire broadcast information within the cell by receiving a Physical Broadcast Channel from the base station. Meanwhile, in the step of initial cell search, the user equipment may receive a Downlink Reference Signal (DL RS) so as to verify the downlink channel status.

Once the user equipment has completed the initial cell search, the corresponding user equipment may acquire more detailed system information by receiving a Physical Downlink Control Channel (PDCCH) and a Physical Downlink Control Channel (PDSCH) based upon the respective information carried in the PDCCH (S302).

Meanwhile, if the user equipment initially accesses the base station, or if there are no radio resources for signal transmission, the user equipment may perform a Random Access Procedure (RACH) with respect to the base station (S303 to S306). In order to do so, the user equipment may transmit a specific sequence to a preamble through a Physical Random Access Channel (PRACH) (S303 and S305), and may receive a response message respective to the preamble through the PDCCH and the PDSCH corresponding to the PDCCH (S304 and S306). In case of a contention based RACH, a Contention Resolution Procedure may be additionally performed.

After performing the above-described process steps, the user equipment may perform PDCCH/PDSCH reception (S307) and Physical Uplink Shared Channel (PUSCH)/Physical Uplink Control Channel (PUCCH) transmission (S308), as general uplink/downlink signal transmission procedures. Most particularly, the user equipment receives Downlink Control Information (DCI) through the PDCCH. Herein, the DCI includes control information, such as resource allocation information respective to the UE, and the format of the DCI may vary depending upon the purpose for using the DCI.

Meanwhile, the control information, which is transmitted by the user equipment to the base station or received by the user equipment from the base station via uplink, includes downlink/uplink ACK/NACK signals, a CQI (Channel Quality Indicator), a PMI (Precoding Matrix Index), an RI (Rank Indicator), and so on. In case of the 3GPP LTE system, the user equipment may transmit control information, such as the above-described CQI/PMI/RI through the PUSCH and/or the PUCCH.

Description will now be made on a MIMO system. MIMO (Multiple-Input Multiple-Output) corresponds to a method of using multiple transmission antennae and multiple reception antennae. Herein, by using this method, data transmission and reception efficiency may be enhanced. More specifically, by using multiple antennae in a transmitting end or receiving end of a wireless communication system, the capacity may be increased, and the performance may be enhanced. Hereinafter, in this document, MIMO may also be referred to as 'multiple antennae (or multi-antennae)'.

In the multiple antennae technology, the reception of one whole message does not depend upon a single antenna path. Instead, in the multiple antennae technology, data may be completed by combining (or merging) a plurality of fragments received from multiple antennae. When using the multiple antennae technology, a data transmission rate within a cell area having a specific size may be enhanced, or a system coverage may be increased by ensuring a specific data transmission rate. Also, this technology may be broadly used in mobile communication terminals and relay stations. Furthermore, by using the multiple antennae technology, limitations in the transmission size that occur during the related art mobile communication, which uses a single antenna, may be overcome.

Figure 4:
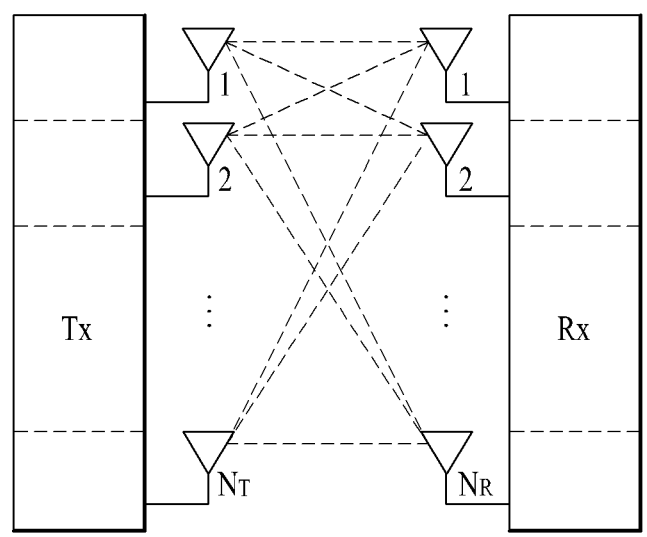
FIG. 4 illustrates a structural view of a multiple antenna communication system.

A schematic view showing the structure of a general multiple antennae (MIMO) communication system, which is described in the present invention, is shown in FIG. 4. Herein, $N_T$ number of transmission antennae is installed in the transmitting end, and $N_R$ number of reception antennae is installed in the receiving end. As described above, when both the transmitting end and the receiving end use multiple antennae, a theoretical channel transmission capacity may be more increased, as compared to when only either one of the transmitting end and the receiving end uses multiple antennae. The channel transmission capacity increases in proportion to the number of antennae. Therefore, the transmission rate may be enhanced, and a frequency rate may also be enhanced If the maximum transmission rate when using a single antenna is referred to as $R_o$, theoretically, the transmission rate when using multiple antennae may be increased as much as the maximum transmission rate $R_o$ multiplied by a rate increase rate $R_i$, as shown in Equation 1.

$$R_i = \min(N_T, N_R) \quad \text{[Equation 1]}$$

For example, in a MIMO communication system using 4 transmission antennae and 4 reception antennae, a theoretical transmission rate 4 times that of a single antenna system may be acquired. Evidence of such theoretical capacity increase of the multiple antennae system was found and proven in the mid 90's. And, since then, diverse technologies for actually enhancing the data transmission rate have been under research and development. And, among such technologies, some of the technologies are already being applied in diverse wireless communication standards, such as the $3^{rd}$ generation mobile communication and the next generation wireless LAN.

Up to now, the research and development associated to multiple antennae have been actively and diversely carried out in many aspects, such as research in the aspect of information theory associated to multiple antennae communication capacity calculation in diverse channel environments and multiple access environments, research in drawing out wireless channel measurements and models of a multiple antennae system, research in time/space signal processing technologies for enhancing transmission reliability and for enhancing the transmission rate, and so on.

Figure 7:
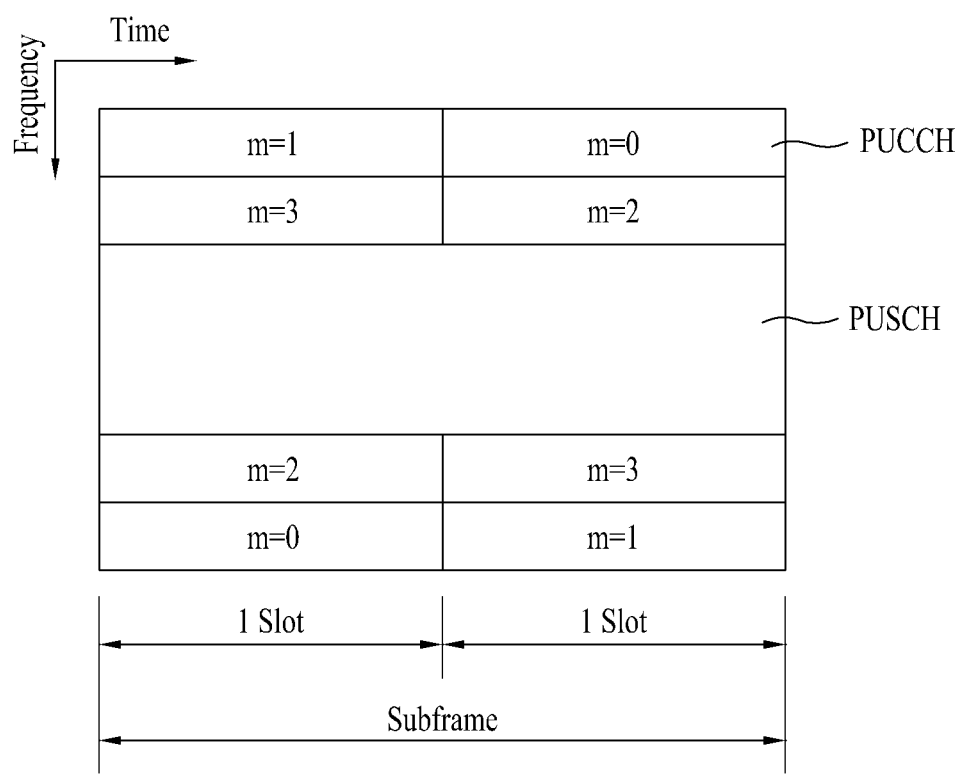
FIG. 7 illustrates an exemplary structure of an uplink radio frame that is used in the LTE system.

In order to provide a more detailed description of the communication method in a multiple antennae system, a mathematical modeling of the communication method may be shown as follows. As shown in FIG. 7, it will be assumed that $N_T$ number of transmission antennae and $N_R$ number of reception antennae exist herein. First of all, in case of a transmitted signal (or transmission signal), since a maximum number of information available for transmission in equal to $N_T$, when $N_T$ number of transmission antennae exists, the transmission information may be indicated in the form of a vector as shown in Equation 2 below.

$$s = [s_1, s_2, \ldots, s_{N_T}]^T \quad \text{[Equation 2]}$$

Meanwhile, a transmission power may vary for each of the transmission information $s_1, s_2, \ldots s_{N_T}$. And, in this case, when each of the transmission power is referred to as $P_1, P_2, \ldots, P_{N_T}$, the transmission information having its transmission power adjusted may be expressed in a vector form as shown in Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, by using a diagonal matrix P of the transmission power, $\hat{s}$ may be indicated as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, consideration will be made on the configuration of $N_T$ number of transmitted signals $x_1, x_2, \ldots, x_{N_T}$ that are actually being transmitted, when a weight matrix W is applied to the information vector $\hat{s}$ having its transmission power adjusted. Herein, the weight matrix performs the role of adequately distributing transmission information to each antenna in accordance with the transmission channel status (or situation). Such transmitted signals $x_1, x_2, \ldots, x_{N_T}$ may be expressed as shown in Equation 5 by using the vector X. Herein, $W_{ij}$ represents a weight between an $i^{th}$ transmission antenna and a $j^{th}$ information. W is referred to as a Weight Matrix or a Precoding Matrix.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Generally, the physical meaning of a rank of a channel matrix may be defined as a maximum number of information, each being different from one another, that can be transmitted in a given channel. Therefore, since the rank of a channel matrix is defined as a minimum number, among the number of independent rows and independent columns, the rank of the matrix cannot be greater than the number of rows or the number of columns. For example, in a mathematical form, a rank (rank(H)) of channel matrix H is limited to the range shown in Equation 6.

$$\text{rank}(H) \leq \min(N_T, N_R) \quad \text{[Equation 6]}$$

Furthermore, it will also be said that each of the different information transmitted by using the multiple antennae technology is defined as a 'transmission stream' or simply a 'stream'. Such 'stream' may also be referred to as a 'Layer'.

Evidently, the number of transmission streams cannot be greater than the rank of the channel having the maximum number for transmitting information, each set of information being different from one another. Therefore, the channel matrix H may be expressed as shown in Equation 7 below.

$$\text{\# of streams} \leq \text{rank}(H) \leq \min(N_T, N_R) \qquad \text{[Equation 7]}$$

Herein, "# of streams" indicates the number of streams. Meanwhile, it shall be noted that one stream may be transmitted through at least one or more antennae.

Diverse methods for corresponding at least one or more streams to multiple antennae may exist. Such methods may hereinafter be described in accordance with the type of multiple antennae technology. In case one stream is transmitted by passing through multiple antennae, the method may correspond to a spatial diversity scheme. And, in case a plurality of streams is transmitted by passing through multiple antennae, the method may correspond to a spatial multiplexing scheme. Evidently, an intermediate method corresponding to a hybrid form of the spatial diversity scheme and the spatial multiplexing scheme may also exist.

Figure 5:
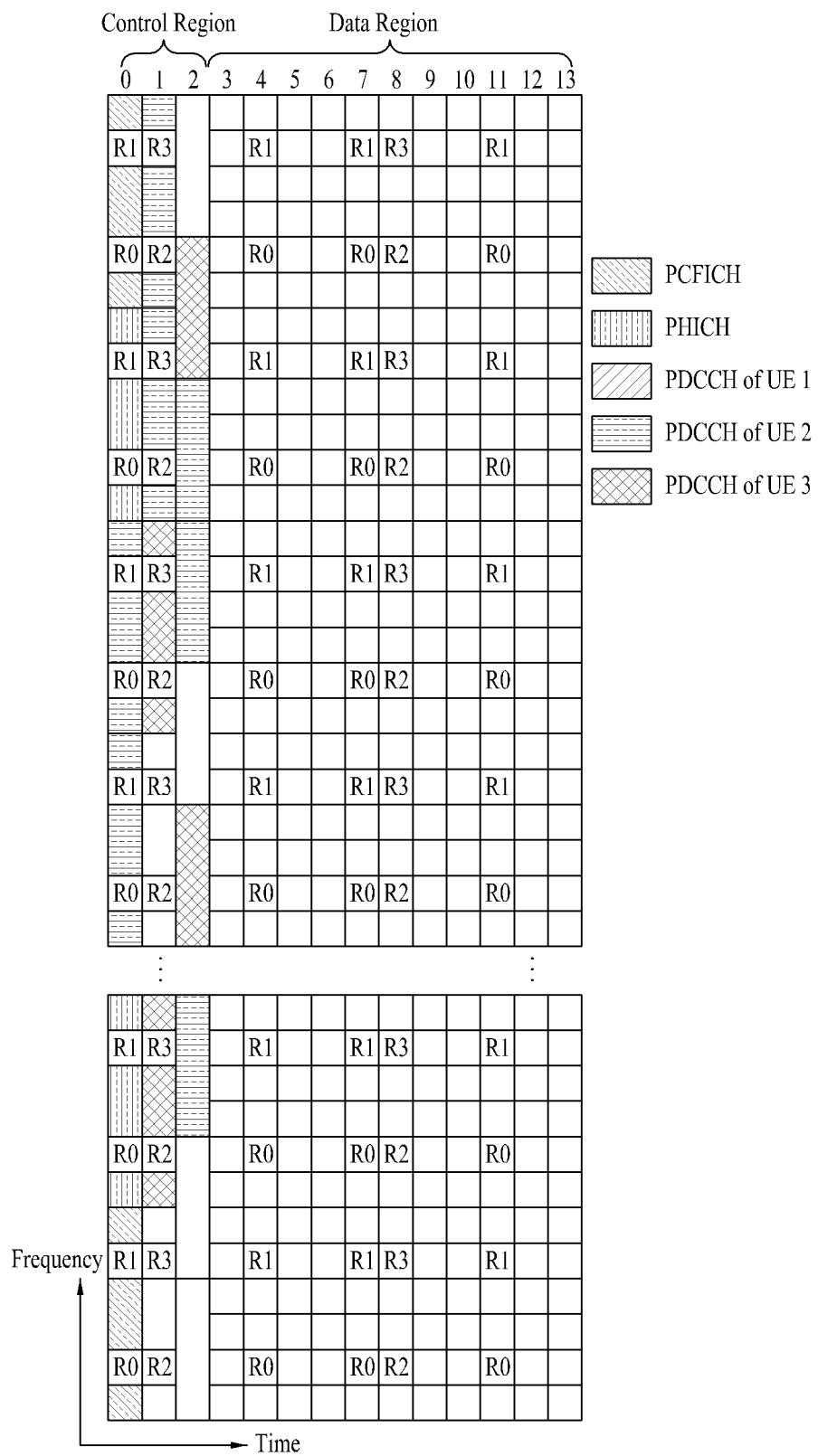
FIG. 5 illustrates an exemplary structure of a downlink radio frame that is used in the LTE system.

FIG. 5 illustrates an exemplary structure of a downlink radio frame that is used in the LTE system.

Referring to FIG. 5, one subframe is configured of 14 OFDM symbols. Depending upon the subframe settings, the first one (1) to three (3) OFDM symbols are used as the control region, and the remaining 13~11 OFDM symbols are used as the data region. Referring to the drawing, R1 to R4 respectively represent Reference Signals (RSs) or Pilot Signals for antennas 0 to 3. Regardless of the control region and the data region, the RS is fixed within the subframe according to a consistent pattern. A control channel is allocated to resources of the control region to which the RS is not allocated. And, a traffic channel is allocated to resources of the data region to which the RS is not allocated. Control channels that are allocated to the control region may include a PCFICH (Physical Control Format Indicator CHannel), a PHICH (Physical Hybrid-ARQ Indicator CHannel), a PDCCH (Physical Downlink Control CHannel), and so on.

As a Physical Control Format Indicator Channel, the PCFICH notifies the user equipment of the number of OFDM symbols used in the PDCCH for each subframe. The PCFICH is located in the first OFDM symbol and is configured at a higher priority level than the PHICH and the PDCCH. The PCFICH is configured of 4 REGs (Resource Element Groups), and each REG is distributed (or spread) within the control region based upon the Cell ID (Cell Identity). One REG is configured of 4 REs (Resource Elements). An RE represents a minimum physical resource defined by one subcarrier×one OFDM symbol. The PCFICH value indicates a value ranging from 1 to 3 or from 2 to 4 depending upon the bandwidth and is modulated by using QPSK (Quadrature Phase Shift Keying).

As a Physical HARQ (Hybrid-Automatic Repeat and request) Indicator Channel, the PHICH is used for delivering HARQ ACK/NACK respective to uplink transmission. More specifically, the PHICH represents a channel through which DL ACK/NACK information for UL HARQ is transmitted. The PHICH consists of one REG and is cell-specifically scrambled. An ACK/NACK is indicated by 1 bit and is modulated by using BPSK (Binary phase shift keying). The modulated ACK/NACK is distributed (or spread) by a Spreading Factor (SF)=2 or 4. A plurality of PHICH being mapped to the same resource configures a PHICH group. The number of PHICHs being multiplexed in the PHICH group is decided in accordance with the number of spreading codes. The PHICH (group) is repeated 3 times in order to obtain diversity gain in the frequency domain and/or the time domain.

As a Physical Downlink Control Channel, the PDCCH is allocated to the first n number of OFDM symbols of a subframe. Herein, n is an integer equal to or greater than 1, and n is designated by the PCFICH. The PDCCH is configured of one or more CCEs (Control Channel Elements). The PDCCH notifies each user equipment or a user equipment group of information associated to resource allocation of a PCH (Paging channel) and a DL-SCH (Downlink-shared channel), Uplink Scheduling Grant, HARQ information, and so on. The PCH (Paging channel) and the DL-SCH (Downlink-shared channel) are transmitted through the PDSCH. Therefore, with the exception for specific control information or specific service data, the base station and the user equipment generally transmit and receive data through the PDSCH.

Information on the user equipment (one user equipment or a plurality of user equipments) to which the data of the PDSCH are to be transmitted, and information on how the user equipments receive and decode the transmitted PDSCH data are included in the PDCCH and transmitted. For example, it is assumed that a specific PDCCH is processed with CRC masking with an RNTI (Radio Network Temporary Identity) "A", and it is also assumed that information on the data being transmitted by using a radio resource (e.g., frequency position) "B" and a transmission format information (e.g., transmission block size, modulation method, coding information, etc.) "C" are transmitted through a specific subframe. In this case, a user equipment within a cell uses its own RNTI so as to monitor the PDCCH. And, when one or more user equipments carries RNTI "A", the corresponding user equipments receive the PDCCH and then receive the PDSCH, which is indicated by "B" and "C", through the received PDCCH information.

FIG. 6 illustrates a resource unit being used for configuring a downlink control channel in the LTE system. Most particularly, (a) of FIG. 6 illustrates a case when the number of transmission antennae of the base station is equal to 1 or 2, and (b) of FIG. 6 illustrates a case when the number of transmission antennae of the base station is equal to 4. Depending upon the number of transmission antennae, only the RS (Reference Signal) patterns are different, and the resource unit configuration method related to the control channel is the same.

Referring to FIG. 6, a basic resource unit of a downlink control channel corresponds to an REG (Resource Element Group). An REG is configured of 4 neighboring resource elements (REs) in a state of excluding the RS. In the drawing, the REG is shown by using bold lining. A PCFICH and a PHICH respectively include 4 REGs and 3 REGs. A PDCCH is configured in CCE (Control Channel Elements) units, and one CCE includes 9 REGs.

In order to allow the user equipment to verify whether or not the PDCCH, which consists of L number of CCEs, is being transmitted to the corresponding user equipment, the user equipment is configured to verify $M^{(L)}(\geq L)$ number of CCEs, which are consecutive or aligned in accordance with a specific rule. The value of L, which is to be considered by the user equipment in order to receive the PDCCH, may correspond to a plurality of values. A group of CCEs that are to be verified by the user equipment in order to receive the PDCCH is referred to as a search space. For example, the LTE system defines the search space as shown in Table 1.

TABLE 1

| Search space $S_k^{(L)}$ | | Number of PDCCH candidates $M^{(L)}$ | |
|---|---|---|---|
| Type | Aggregation level L | Size [in CCEs] | DCI formats |
| UE-specific | 1 | 6 | 6 | 0, 1, 1A, 2B, |
| | 2 | 12 | 6 | 1D, 2, 2A, 2B, 4 |
| | 4 | 8 | 2 | |
| | 8 | 16 | 2 | |
| Common | 4 | 16 | 4 | 0, 1A, 1C, 3/3A |
| | 8 | 16 | 2 | |

Herein, a CCE aggregation level L indicates the number of CCEs configuring the PDCCH, $S_k^{(L)}$ represents a search space of the CCE aggregation level L, and $M^{(L)}$ indicates a number of PDCCH candidates that are to be monitored in the search space of the aggregation level L.

The search space may be divided into a UE-specific search space, wherein access is allowed only to a specific user equipment, and a common search space, wherein access is allowed to all user equipments within the cell. The user equipment monitors the common search space corresponding to CCE aggregation levels 4 and 8, and the user equipment also monitors the UE-specific search space corresponding to CCE aggregation levels 1, 2, 4, and 8. The common search space and the UE-specific search space may overlap one another.

Furthermore, in the PDCCH search space assigned to an arbitrary user equipment with respect to each CCE aggregation level value, the position of the first CCE (CCE having the lowest index) varies for each subframe in accordance with the user equipment. This is referred to as PDCCH search space hashing.

The CCE may be distributed (or spread) throughout the system bandwidth. More specifically, a plurality of logically consecutive CCEs may be inputted to an interleaver. And, the interleaver may perform a function of mixing (or interleaving) the plurality of inputted CCEs in REG units. Accordingly, the frequency/time resource configuring one CCE is physically spread throughout the entire frequency/time domain within the control region of the subframe, thereby being distributed. Eventually, although the control channel is configured in CCE units, by performing the interleaving process in REG units, frequency diversity and interference randomization may be maximized.

FIG. 7 illustrates an exemplary structure of an uplink subframe that is used in the LTE system.

Referring to FIG. 7, an uplink subframe may be divided into a region having a PUCCH (Physical Uplink Control CHannel) carrying control information allocated thereto, and a region having a PUSCH (Physical Uplink Shared CHannel) carrying user data allocated thereto. A middle portion of the subframe is allocated to the PUSCH, and both end portions of the data region within the frequency domain are allocated to the PUCCH. The control information that is transmitted over the PUCCH includes an ACK/NACK being used for the HARQ, a CQI (Channel Quality Indicator) indicating a downlink channel status, an RI (Rank Indicator) for MIMO, an SR (Scheduling Request) corresponding to an uplink resource allocation request, and so on. The PUCCH for one user equipment uses one resource block, which occupies a different frequency for each slot within the subframe. More specifically, 2 resource blocks being allocated to the PUCCH are frequency hopped at a slot boundary. Most particularly, FIG. 6 shows an example of a PUCCH wherein m=0, a PUCCH wherein m=1, a PUCCH wherein m=2, and a PUCCH wherein m=3 are allocated to the subframe.

Meanwhile, in the current wireless communication environment, due to the advent and supply of a wide range of devices requiring M2M (Machine-to-Machine) communication and a high data transmission capacity, the required data size for a cellular network is increasing at a very fast rate. In order to meet with the increasing size of required data (or data demand), the communication technology is evolving to a carrier aggregation technology, and so on, for efficiently using a larger number of frequency bands, and to a multi-antenna technology, a multi-base station coordination technology, and so on, for increasing data capacity within a limited frequency, and the communication environment is evolving to an environment having an increasing node density that can be accessed within neighboring areas of the user. A system equipped with such increased node density may yield a more enhanced performance due to the coordination (or cooperation) between the nodes. By having each node operate as an independent base station (Base Station (BS), Advanced BS (ABS), a Node-B (NB), an eNode-B (eNB), Access Point (AP), and so on), such methods may yield more excellent performed as compared to when coordination between the nodes is not established.

Figure 8:
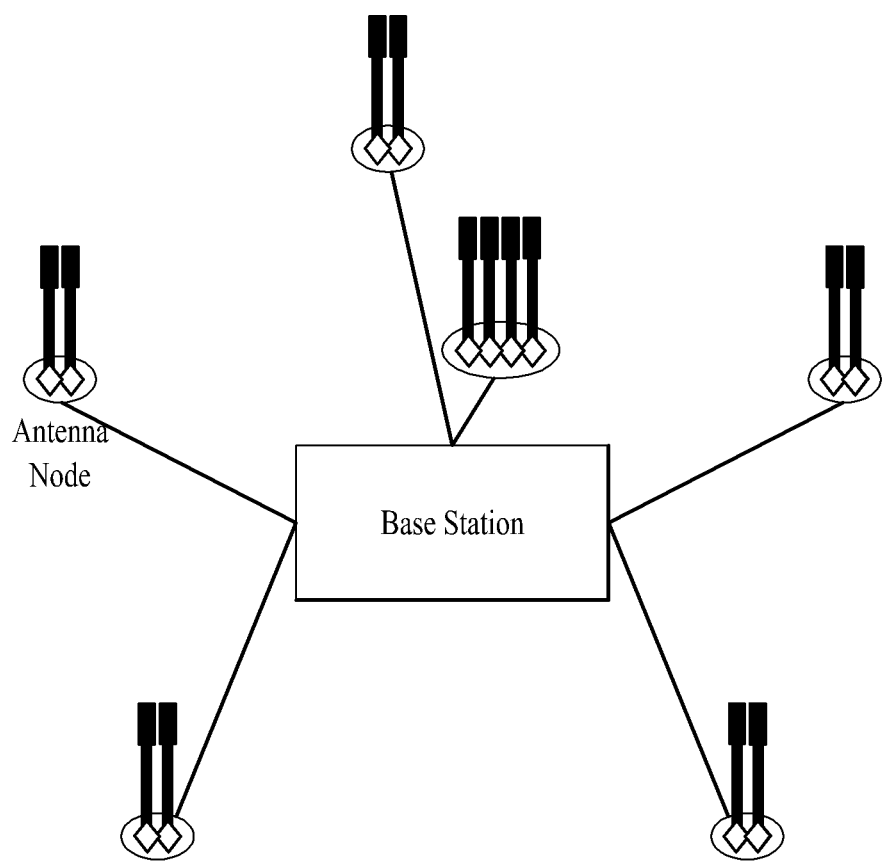
FIG. 8 illustrates an exemplary multiple node system in a next generation communication system.

FIG. 8 illustrates an exemplary multiple node system in a next generation communication system.

Referring to FIG. 8, when one controller manages the transmission and reception (or transception) of all nodes, and when an individual node operates as a part of an antenna group within a cell, this system may be viewed as a distributed multi node system (DMNS). At this point, the individual nodes may be assigned with a separate Node ID, or the individual nodes may operate as part of an antenna within a cell without being assigned with a separate node ID. However, when each of the nodes has a different Cell identifier (ID), this may be viewed as a multi cell system. And, when such multiple cells (or multi-cell) are configured to have an overlapping structure depending upon the coverage, this will be referred to as a multi-tier network.

Meanwhile, Node-B, eNode-B, PeNB), HeNB, RRH (Remote Radio Head), relay, and distributed antenna, and so on, may correspond to the node, and at least one antenna is installed in the node. The node is also referred to as a Transmission Point. Although the node generally refers to an antenna group that is spaced apart at a predetermined distance (or interval), in the present invention, the node may be applied even if the node is defined as an arbitrary antenna group regardless of the distance (or interval).

Due to the introduction of the above-described multi node system and relay node, although enhancement in the channel quality may be realized as diverse communication methods (or schemes) can be applied, in order to apply the above-described MIMO scheme and inter-cell coordinated communication scheme to the multi node environment, the introduction of a new control channel is being required. A new type of control channel, which is being discussed to be newly applied due to such requirements, corresponds to an E-PDCCH (Enhanced-PDCCH), and this has been decided to be allocated to a data region (hereinafter referred to as a PDSCH region) instead of the conventional control region (hereinafter, PDCCH region). Eventually, since control information respective to the node for each user equipment can be transmitted through such E-PDCCH, a problem related to a lack of the conventional PDCCH region may also be resolved. For reference, the E-PCDCCH is not provided to the conventional legacy user equipment, and only the LTE-A user equipments may receive the E-PDCCH.

Figure 9:
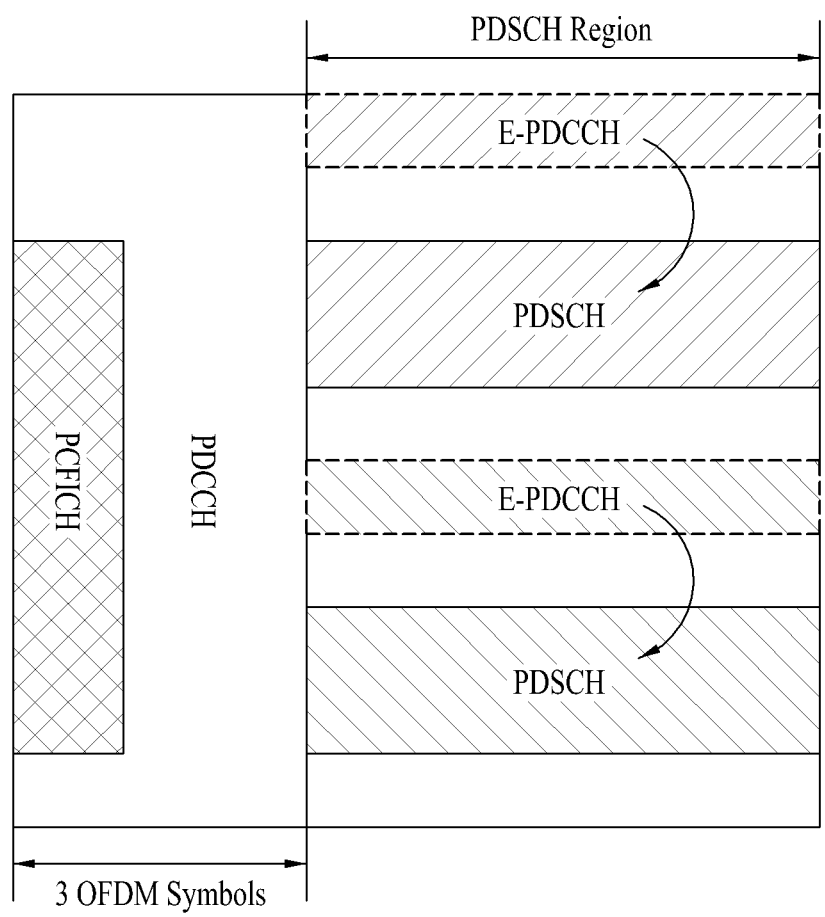
FIG. 9 illustrates examples of an E-PDCCH and a PDSCH being scheduled by the E-PDCCH.

FIG. 9 illustrates examples of an E-PDCCH and a PDSCH being scheduled by the E-PDCCH.

Referring to FIG. 9, the E-PDCCH may generally be used by defining a portion of the PDSCH region, which transmits data, and the user equipment is required to perform blind decoding procedure in order to detect the presence or absence of its own E-PDCCH. Although the E-PDCCH performs the same scheduling operations (i.e., PDSCH, PUSCH control) as the conventional PDCCH, when the number of user equipments accessing the node, such as the RRH, increased, there may exist a disadvantage in that, since a larger number of E-PDCCH is being allocated to the PDSCH region, the user equipment is required to performed an increased number of blind decoding sessions, thereby causing complexity to be increased.

The conventional PDDCH was allocated to a PDCCH region by using a Frequency First Mapping method by using DCI (Downlink Control Information), which is configured of one CCE (Control Channel Element) or an aggregation of multiple CCEs (Control Channel Elements) each having a pre-decided size. However, in one subframe, since the E-PDCCH, which is either allocated along with the conventional PDCCH or individually (or separately) allocated, is allocated to the data region (PDCH region), a resource allocation method that is different from that of the conventional PDCCH should be considered.

Most particularly, since multi-user-MIMO (MU-MIMO) or beamforming, and so on, can be applied for the E-PDCCH, transmission based upon a DM-RS, which corresponds to a UE-specific reference signal, is performed, and, in this case, a general interleaving method that is applied to the PDCCH may not be applied. Therefore, when multiple CCEs are consecutively allocated, a PRB-pair unit resource allocation having a resource block (RB) configured in two consecutive slots is more advantageous and required. More specifically, the CCE for the E-PDCCH (hereinafter referred to as E-CCE) shall be allocated in PRB-pair units, and one PRB-pair is required to be allocated by processing one PRB-pair with adequate partitioning to E-CCE unit subsets. However, depending upon the subframe configuration, due to the characteristics of the PDSCH region, it is very difficult to accurately divide the number of usable REs included in a PRB-pair by a multiple of 36 REs, which corresponds to the conventional CCE allocation unit.

Therefore, when a number of usable REs that can be allocated to the E-CCE is given from the PRB-pair, the present invention proposes a method related to how many subsets the given number of usable REs is to be divided and allocated to the E-CCE and related to how many REs each of the E-CCEs are to be configured. Additionally, the present invention also proposes a resource allocation method respective to the number of subsets configuring the PRB-pair.

<Number of Subsets for E-PDCCH in PRB-Pair>

Figure 10:
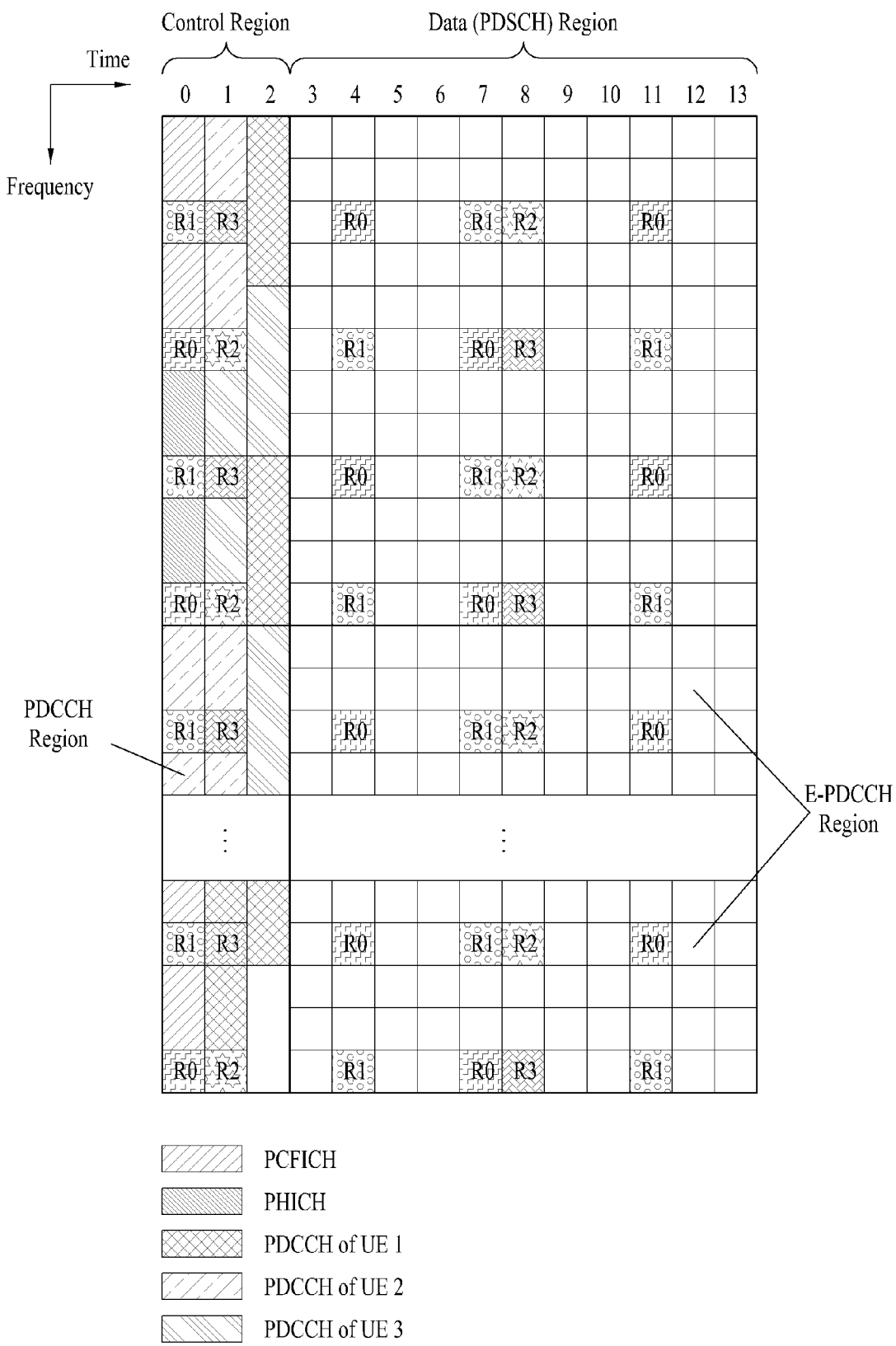
FIG. 10 illustrates examples of a PDCCH region and an E-PDCCH region shown in a subframe.

FIG. 10 illustrates examples of a PDCCH region and an E-PDCCH region shown in a subframe.

Referring to FIG. 10, as described above, the conventional PDCCH uses a portion of the symbols at the front portion (or beginning) of the corresponding subframe as the control region, and the PDCCH is allocated within the range of the control region. Additionally, the E-PDCCH may be allocated to the PDSCH region after the control region, and the RB may correspond to the allocation unit of the E-PDCCH.

When it is assumed that the E-PDCCH is allocated by the conventional CCE structure (36 REs) in the PRB-pair, the E-CCE may be aggregated or partitioned by a number of REs corresponding to the multiple of the 36 REs. More specifically, aggregation (or combination) may be realized by using one to four subsets, only in case the number of usable REs existing in the PRB-pair is equal to 36, 72, 108, and 144. However, based upon a reference signal (CRS, DM-RS, CSI-RS) or a PDCCH symbol (a maximum of 3 symbols) that is actually used within the subframe, diverse types of configurations shown in Table 2 may be considered. Table 2 shown below shows examples of the number of valid REs with respect to the reference signal and PDCCH within a PRB-pair.

TABLE 2

|  | Normal CP Mode | Extended CP Mode |
|---|---|---|
| No RS, No PDCCH | 168 | 144 |
| CRS | 144 | 120 |
| CRS + DM-RS | 120 | 104 |
| CRS + DM-RS + PDCCH | 92~112 | 76~96 |
| CRS + DM-RS + PDCCH + CSI-RS (Max 8RE) | 84~112 | 68~96 |
| CRS + DM-RS + PDCCH + CSI-RS + DM-RS(Rel-8) port#5 | 81~109 | 65~93 |

Additionally, in case of a specific subframe of a TDD system, wherein a guard period for switching to and from a transmission mode and a reception mode exists, the number of downlink allocation symbols respective to a Special subframe configuration, as shown in FIG. 3, is variable, and the number of valid REs and the number of symbols may also vary accordingly. Table 3 shown below shows an example of a number of valid REs in a PRB-pair with respect to a Special subframe configuration in a TDD system.

TABLE 3

| | Normal CP Mode DwPTS | | | Extended CP Mode DwPTS | | |
|---|---|---|---|---|---|---|
| | | Number of REs | | | Number of REs | |
| Special subframe configuration | Number of symbols | 1 PDCCH symbol | 2 PDCCH symbol | Number of symbols | 1 PDCCH symbol | 2 PDCCH symbol |
| 0 | 3 | 20 | 12 | 3 | 20 | 12 |
| 1 | 9 | 57~68 | 49~60 | 8 | 52~60 | 44~52 |
| 2 | 10 | 69~80 | 61~72 | 9 | 64~72 | 56~64 |
| 3 | 11 | 81~92 | 73~84 | 10 | 72~80 | 64~72 |
| 4 | 12 | 89~100 | 81~92 | 3 | 20 | 12 |
| 5 | 3 | 20 | 12 | 8 | 52~60 | 44~52 |
| 6 | 9 | 57~68 | 49~60 | 9 | 64~72 | 56~64 |
| 7 | 10 | 69~80 | 61~72 | — | — | — |
| 8 | 11 | 81-92 | 73-84 | — | — | — |

Referring to Table 2 and Table 3, with the exception for special cases when the CRS does not exist, the number of valid REs is within the range of 65~144, and, in a special subframe of the TDD system, it is apparent that 12 valid REs (3 downlink symbols and 2 PDCCH symbols), 20 valid REs (3 downlink symbols and 1 PDCCH symbol), 44~100 valid REs may exist. However, in Table 3, when the number of downlink allocation symbols is equal to 3, since the process of allocating the E-PDCCH to a region excluding the PDCCH, i.e., one symbol or two symbols, is eventually similar the allocation method of the conventional PDCCH, this case will be excluded. More specifically, when considering both the case of a general subframe and the case of a special subframe in the TDD system, it may be viewed that 44~144 valid REs exist.

More specifically, a minimum number of usable REs is equal to 44, and this is close to 36 REs, which corresponds to the size of one conventional CCE. Additionally, a maximum value 144 REs is equal to the size of four conventional CCEs. Therefore, a PRB-pair may be divided into 1 subset~4 subsets depending upon the subframe configuration.

<Maximum Value and Minimum Value of a Subset Size>

Meanwhile, in order to be applied to all subframe configurations, each E-CCE size cannot use a fixed value and varies within a constant range. In deciding a new E-CCE size, the conventional CCE size 36 REs may be taken into consideration, and it is preferable to set up a maximum value and a minimum value for one CCE size within a range that does not largely deviate from this value.

Figure 11:
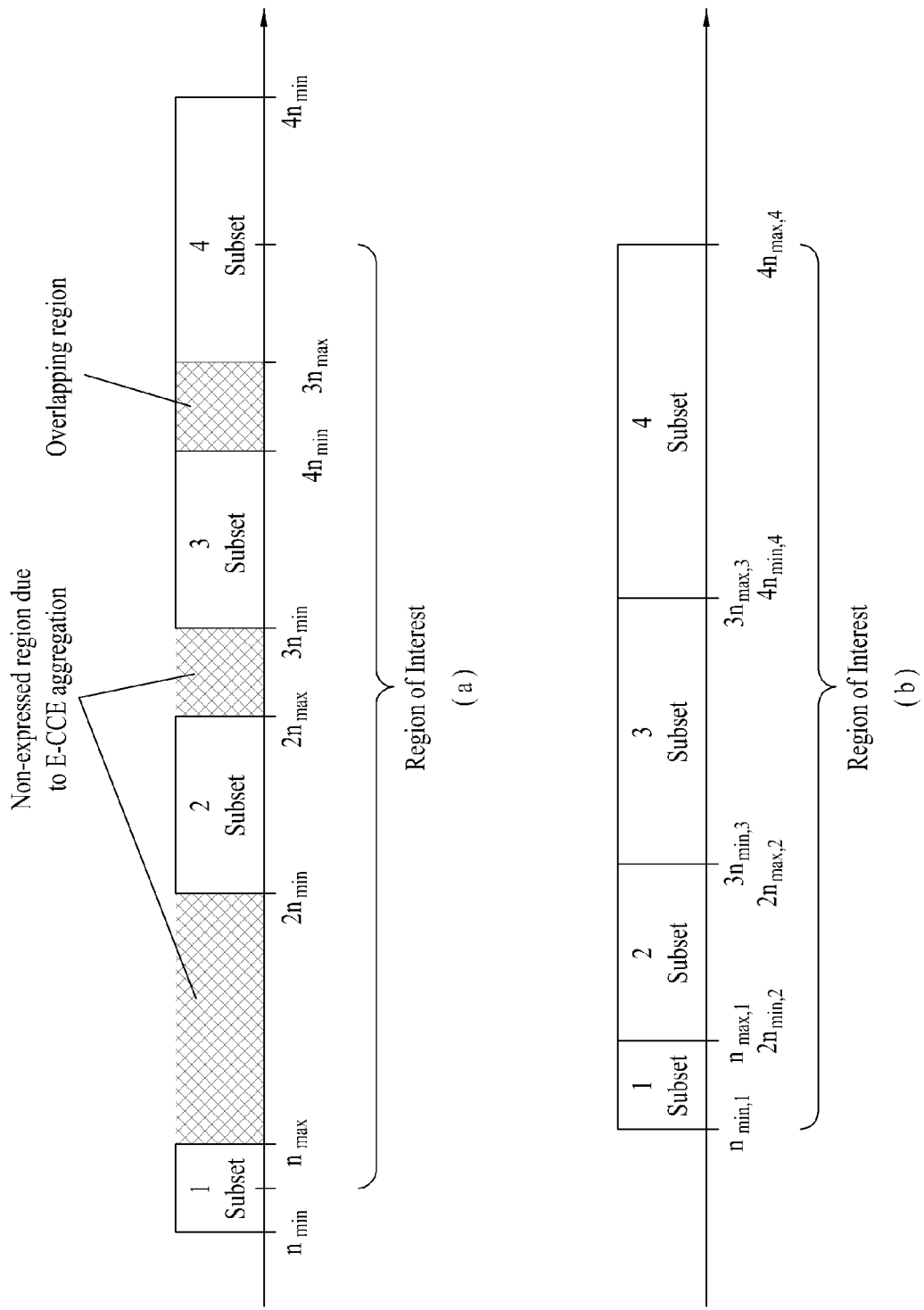
FIG. 11 illustrates an example of setting up a number of E-CCE subsets and valid regions according to an exemplary embodiment of the present invention.

FIG. 11 illustrates an example of setting up a number of E-CCE subsets and valid regions according to an exemplary embodiment of the present invention.

When it is assumed that the same maximum value and the same minimum value is always being used without considering the number of subsets being partitioned for each PRB-pair, problems may occur, such as a region that cannot be expressed (or non-expressed region) and a region expressed to be overlapping one another due to each subset may be generated within a region of interest, and regions for which it is relatively difficult to decide an optimal number of subsets for configuring the corresponding region may also be generated.

For example, referring to (a) of FIG. 11, when it is assumed that the maximum value ($n_{max}$) and the minimum value ($n_{min}$) of a case when a PRB-pair is being divided into one subset is identically applied to a case when a PRB-pair is being divided into two subsets, i.e., when it is assumed that $2n_{max}$ is being applied as the maximum value and $2n_{min}$ is being applied as the minimum value, it is apparent that a region that cannot be expressed may occur due to the E-CCE aggregation (or combination). Additionally, it is assumed that the maximum value ($3n_{max}$) and the minimum value ($3n_{min}$) of a case when a PRB-pair is being divided into three subsets is identically applied to a case when a PRB-pair is being divided into four subsets, i.e., when it is assumed that $4n_{max}$ is being applied as the maximum value and $4n_{min}$ is being applied as the minimum value, it is apparent that a region expressed as an overlapping region occurs.

In this case, such problems may be resolved by varying the maximum value and the minimum value depending upon the number of subsets, as shown in (b) of FIG. 11.

Figure 12:
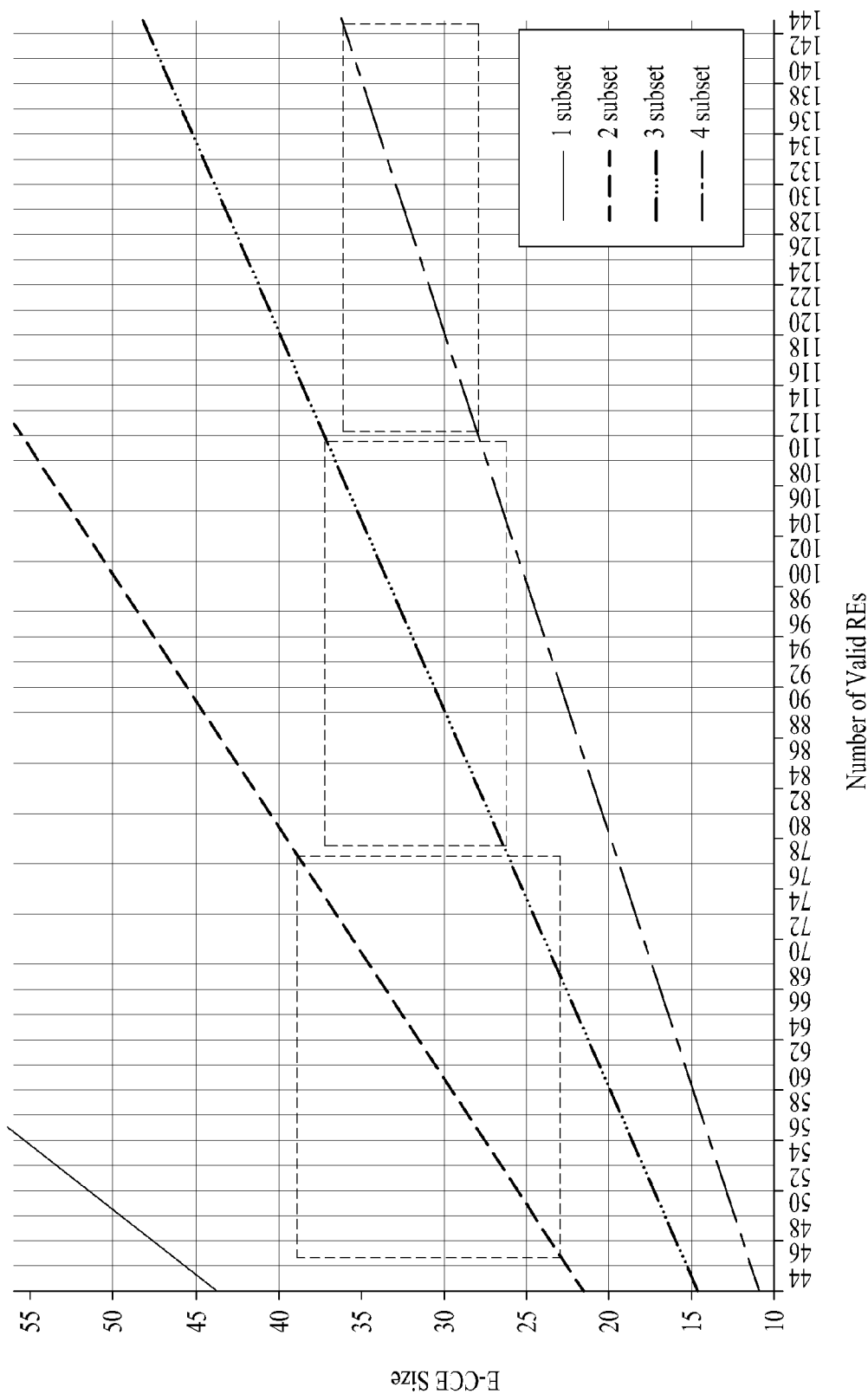
FIG. 12 illustrates a relation between a number of valid REs and an average E-CCE size respective to a change in the number of subsets according to an exemplary embodiment of the present invention.

FIG. 12 illustrates a relation between a number of valid REs and an average E-CCE size respective to a change in the number of subsets according to an exemplary embodiment of the present invention.

Although the maximum value and the minimum value of each E-CCE may be differently set up depending upon the number of subsets, if the minimum value is set to have an excessively low value, a DCI that cannot obtain sufficient coding gain with only one E-CCE may be generated, and, in this case, multiple E-CCEs are required to be aggregated and used. Conversely, if the maximum value is set to have an excessively high value, the coding rate may be excessively low as compared to the actual size of the DCI, thereby causing waste in resources.

Therefore, if a minimum coding rate for the DCI is summed to be approximately 0.75, since a sufficient coding rate may be ensured by configuring 46 REs as one E-CCE, it is preferable to set the maximum value to 46 or less. More specifically, in case the largest DCI size is equal to 68 bits, when the 68 bits are modulated by using QPSK, the 68 bits may be modulated to 34 modulation symbols, and, in order to ensure a coding rate of 0.75 or less, mapping should be performed on 45.333 . . . REs. Therefore, considering the case when the largest DCI is transmitted to one ECCE, it is preferable to set up the maximum value to 46.

Additionally when a number of REs smaller than 23 is used in one E-CCE, 2 or more aggregation levels may be required to be used, and, therefore, it is preferable to set the minimum value to 23 or higher. More specifically, when one ECCE is configured of 23 REs, in order to transmit DCI having the size of 68 bits, 2 (two) E-CCEs should be grouped (or aggregated). However, if the E-CCE size becomes smaller than 23 REs, 4 (four) ECCEs may have to be grouped (or aggregated) instead of 2 (two) ECCEs, and, therefore, the minimum value should be equal to at least 23 or more. Reference may be made to Table 4 shown below.

TABLE 4

| Number of subsets | Maximum value | Minimum value |
|---|---|---|
| 1 | 45 | 44 |
| 2 | 39 | 23 |
| 3 | 37 | 26 |
| 4 | 36 | 28 |

Most particularly, in FIG. 12, it will be assumed that in one PRB-pair, the number of valid REs is equal to a minimum of 44 REs to a maximum of 144 REs. Additionally, with the exception of a case when one PRB-pair can be filled with only 1 (one) subset, when the PRB-pair is partitioned to 2 subsets to 4 subsets, it will be assumed that the valid REs are equally divided and allocated to each subset.

In this case, although there may exist diverse methods for deciding the size of each subset existing in the PRB-pair, in order perform allocation so that the interval between the E-CCEs can be as equal as possible, the method shown below in Table 5 may be considered. More specifically, the size of each of the E-CCEs is set to have an average value per subset or its approximate value, and, most particularly, in Table 5, the E-CCE size may correspond to only 1 type, or the E-CCE size may be configured of the value of 2 different types having a size difference equivalent to 1 RE.

TABLE 5

| REs | # of Subsets | Subset1 | Subset2 | Subset3 | Subset4 |
|---|---|---|---|---|---|
| 45 | 1 | 45 | | | |
| 46 | 2 | 23 | 23 | | |
| 47 | 2 | 24 | 23 | | |
| 78 | 3 | 26 | 26 | 26 | |
| 79 | 3 | 27 | 26 | 26 | |
| 80 | 3 | 27 | 27 | 26 | |
| 111 | 3 | 37 | 37 | 37 | |
| 112 | 4 | 28 | 28 | 28 | 28 |
| 126 | 4 | 32 | 32 | 31 | 31 |
| 144 | 4 | 36 | 36 | 36 | 36 |

Figure 13:
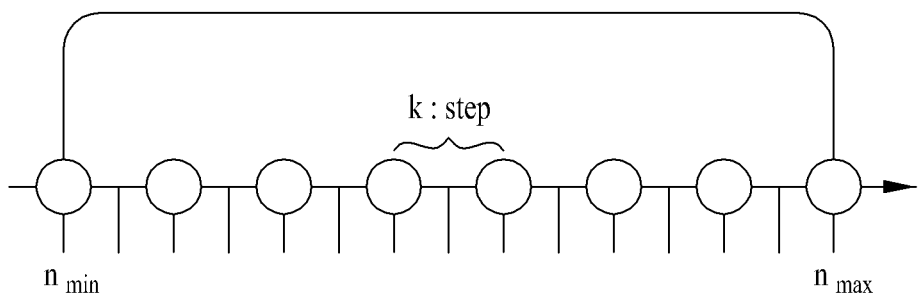
FIG. 13 illustrates a size of an E-CCE, which can be selected from a range between a maximum value and a minimum value, according to an exemplary embodiment of the present invention, when it is assumed that a value that can be assigned as the size of the E-CCE may be quantized by k number of steps.

Meanwhile, FIG. 13 illustrates a size of an E-CCE, which can be selected from a range between a maximum value and a minimum value, according to an exemplary embodiment of the present invention, when it is assumed that a value that can be assigned as the size of the E-CCE may be quantized by k number of steps. In this case, k may be equal to 4 in accordance with an REG size, which corresponds to the basic unit of the conventional CCE, and k may also be given a smaller value such as 2 or 1. This value may be received from an upper layer in accordance with the subframe configuration.

Referring to FIG. 13, if the value of k is equal to 4, subset partitioning may be realized without having to leave out (or waste) any REs only if the number of valid REs within the PRB-pair corresponds to a multiple of 4, which as the basic unit of the REG However, depending upon the subframe configuration, since some REs may be inevitably left out (or wasted), in some cases, a maximum of (k−1) REs may be left out (or discarded) without being used as the E-CCE.

Figure 14:
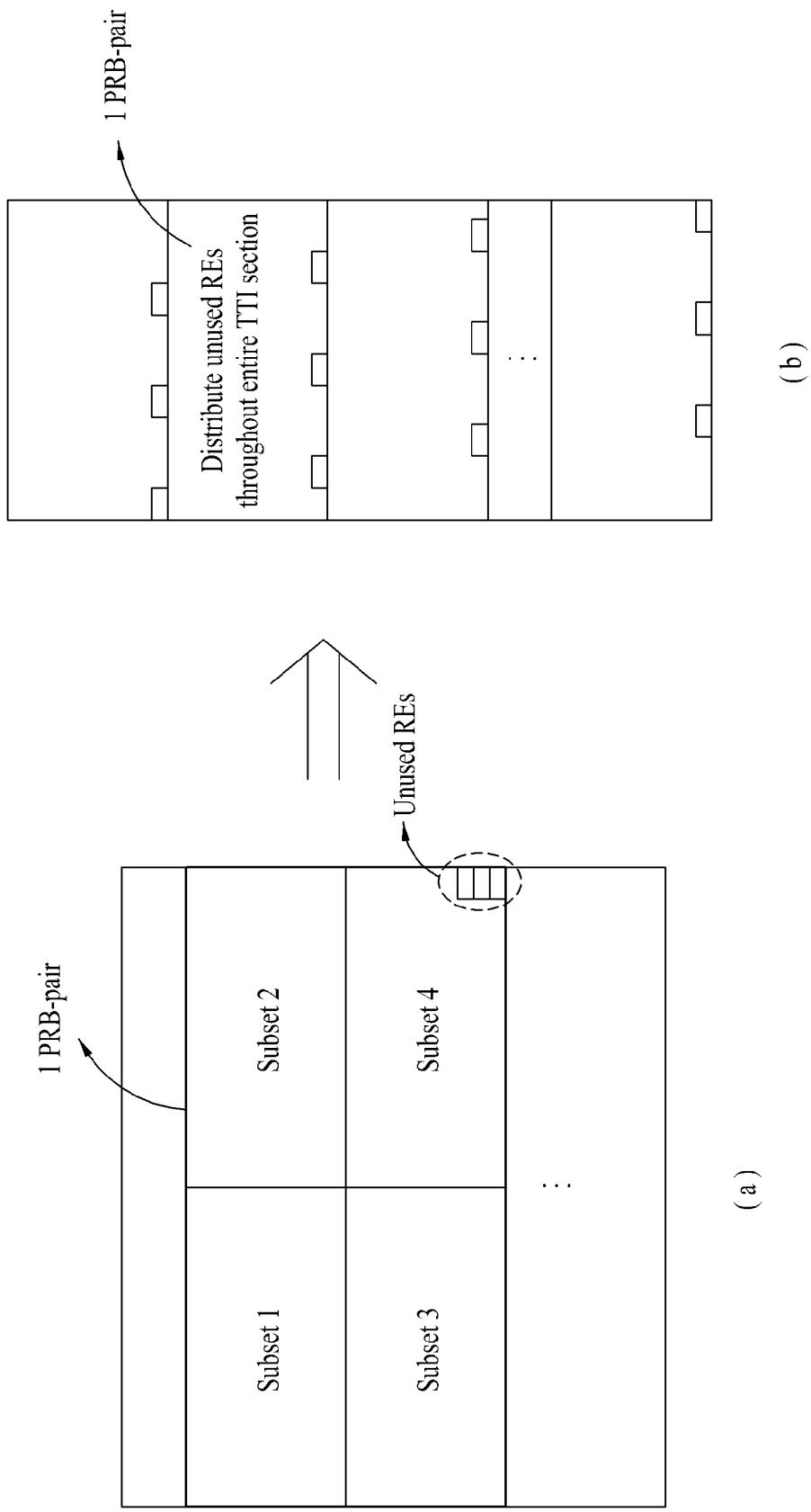
FIG. 14 illustrates a comparison between a case when unused REs are concentrated to one symbol and a case when unused REs are distributed to multiple symbols.

FIG. 14 illustrates a comparison between a case when unused REs are concentrated to one symbol and a case when unused REs are distributed to multiple symbols.

If unused REs are concentrated to only one symbol, as shown in (a) of FIG. 14, transmission power of a specific symbol may only unevenly transmitted. More specifically, when it is assumed that 1 RB is configured of 12 subcarriers, and when it is also assumed that each RE is transmitted by using the same power and that unused REs are remained vacant (i.e., zero-power), when a maximum of 3 unused REs are concentrated to one symbol, a difference in power of a maximum of 25% as compared to other symbols performing transmission by using full power may occur. In order to prevent such difference from occurring, the unused REs are distributed throughout the entire TTI section of the subframe.

More specifically, when the E-CCE size is divided into k number of steps, and when R number of REs remain (R<k), the remaining REs may be distributed throughout all symbols and the entire PRB-pair, as shown in (b) of FIG. 14. When the index of the PRB-pair is given as $n_{RB}$, and when the number of symbols being used as the E-PDCCH region within the subframe is given as $N_{Sym}$, among the remaining REs, position f(R,n) of a symbol being included in the $n^{th}$ RE may be expressed as shown in Equation 8. However, in this case, the position of the subcarriers having such REs located therein should be allocated while avoiding the subcarriers having the RS located therein.

$$f(R, n) = \left(n_{RB} + \text{round}\left(\frac{N_{Sym}}{R}\right) \cdot (n-1)\right) \bmod N_{sym} \quad \text{[Equation 8]}$$

<Resource Allocation Method Respective to Number of Subsets>

Figure 15:
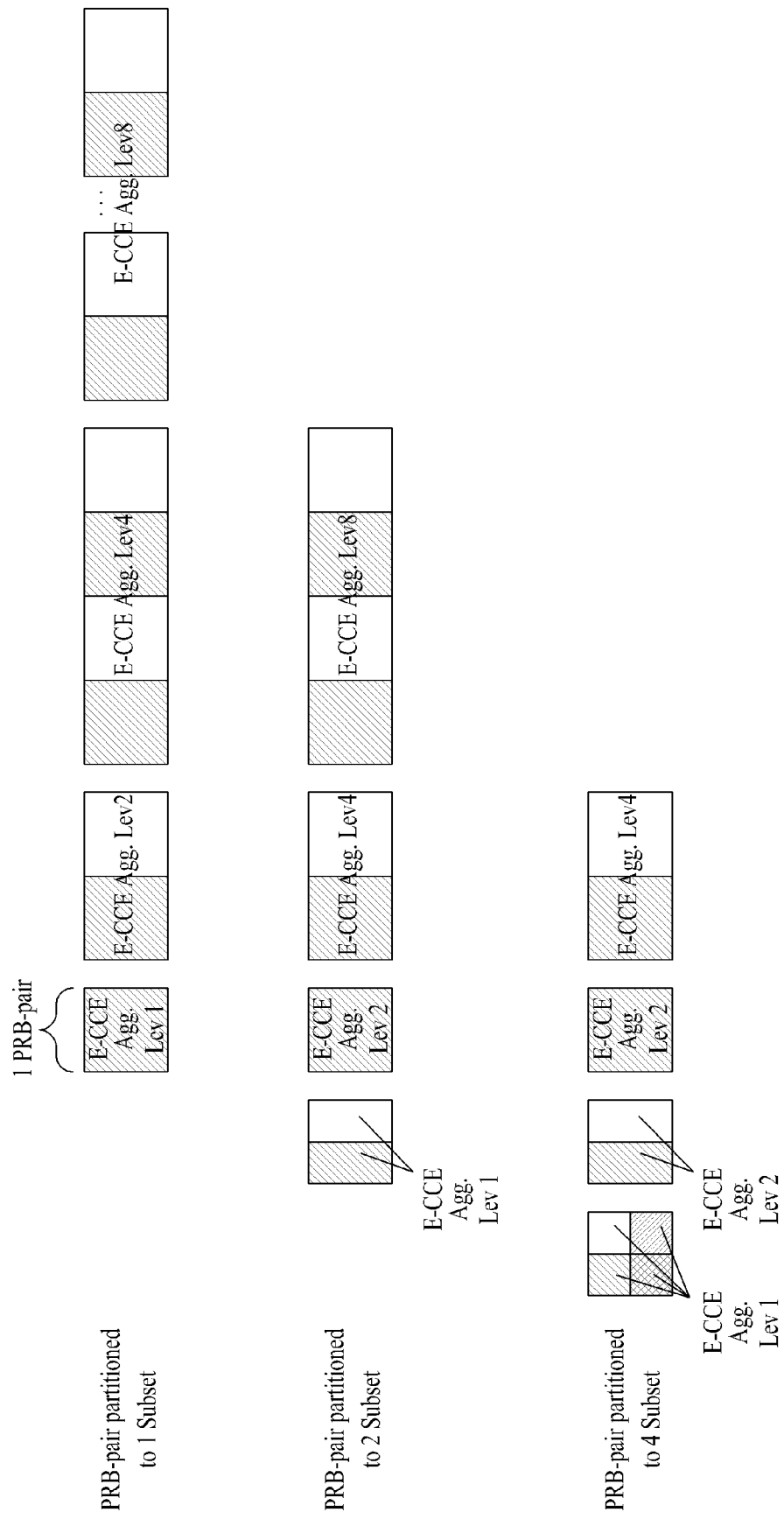
FIG. 15 illustrates an exemplary DCI allocation method in a case when a PRB-pair partitioned to 1, 2, and 4 subsets.

Meanwhile, FIG. 15 illustrates an exemplary DCI allocation method in a case when a PRB-pair partitioned to 1, 2, and 4 subsets.

Referring to FIG. 15, when 1 PRB-pair is partitioned to 1, 2, or 4 subsets, a method allocating DCI throughout 1 PRB-pair or multiple PRB-pairs or a method of allocating multiple sets of DCI to one PRB-pair with respect to aggregation levels 1, 2, 4, and 8, as shown in FIG. 15, may be considered. However, in case of partitioning one PRB-pair to 3 subsets, due to the number of allocated UEs and the allocation of RS antenna ports, the problem may become more complicated.

FIG. 16 illustrates an exemplary DCI allocation method in a case when a PRB-pair partitioned to 3 subsets.

In a normal CP mode, when an E-PDCCH for three users being identified by the DM-RS is allocated to one PRB-pair, although the number of antenna ports that are being used is equal to 3, the DM-RS resource being allocated to the subframe corresponds to 24 REs per 1 PRB-pair, thereby allowing all usable DM-RSs to be used.

Therefore, as shown in (a) of FIG. 16, in an aspect of saving RS resources, a method of dividing 3 subsets into 2 parts (Aggregation Level 1+Aggregation Level 2), or a method of multiplexing 3 subsets by using a code division multiplexing (CDM) method, which identifies one antenna port with a scrambling ID (SCID), may be considered. In both cases, only 12 REs per 1 PRB-pair is used as the resource for all DM-RSs. More specifically, as a case of using 2 DM-RS antenna ports, 12 REs are being used.

Meanwhile, when 1 PRB-pair is partitioned to 3 subsets, and in case the Aggregation Level is equal to Level 4 or higher, such DCI cannot be allocated to only 1 PRB-pair. In this case, when scheduling is performed by using sub-band CSI in a non-interleaved localized mode, since it will be advantageous to use a minimum number of PRB-pairs, the DCI shall be allocated throughout 2 PRBs, as shown in (b) of FIG. 16.

More specifically, when one PRB-pair is partitioned to 3 subsets, the 3 subsets may be divided into (Aggregation Level 2+Aggregation Level 2) or (Aggregation Level 1+Aggregation Level 3), as shown in (b) of FIG. 16. Herein, when one PRB-pair is divided into 3 subsets, and when Aggregation Level 4 is realized by using the (Aggregation Level 2+Aggregation Level 2) format, operation is performed so that only a maximum of 2 subsets can be used for the transmission of one E-PDCCH.

Herein, however, when only wide-band CSI is available for usage, since is it advantageous to acquire diversity gain by allocating resources throughout a larger number of PRB-pairs, resources are allocated throughout 3 PRB-pairs (Aggregation Level 2+Aggregation Level 1+Aggregation Level 1) or 4 PRB-pairs of Aggregation Level 1. Even in case of Aggregation Level 8, it is preferable to apply an extension of Aggregation Level 4.

Meanwhile, in case one PRB-pair is partitioned to 3 subsets, although DCI of Aggregation Level 1 or 2 can be processed with continuous allocation in 1 PRB-pair, DCI of Aggregation Level 4 is allocated to multiple PRB-pairs, and its allocation method also becomes more complicated. When considering this in the aspect of the search space, which corresponds to a logical domain, in order to facilitate resource allocation, it is preferable to perform resource allocation by adding 1 virtual null E-CCE in addition to 3 E-CCEs.

Figure 17:
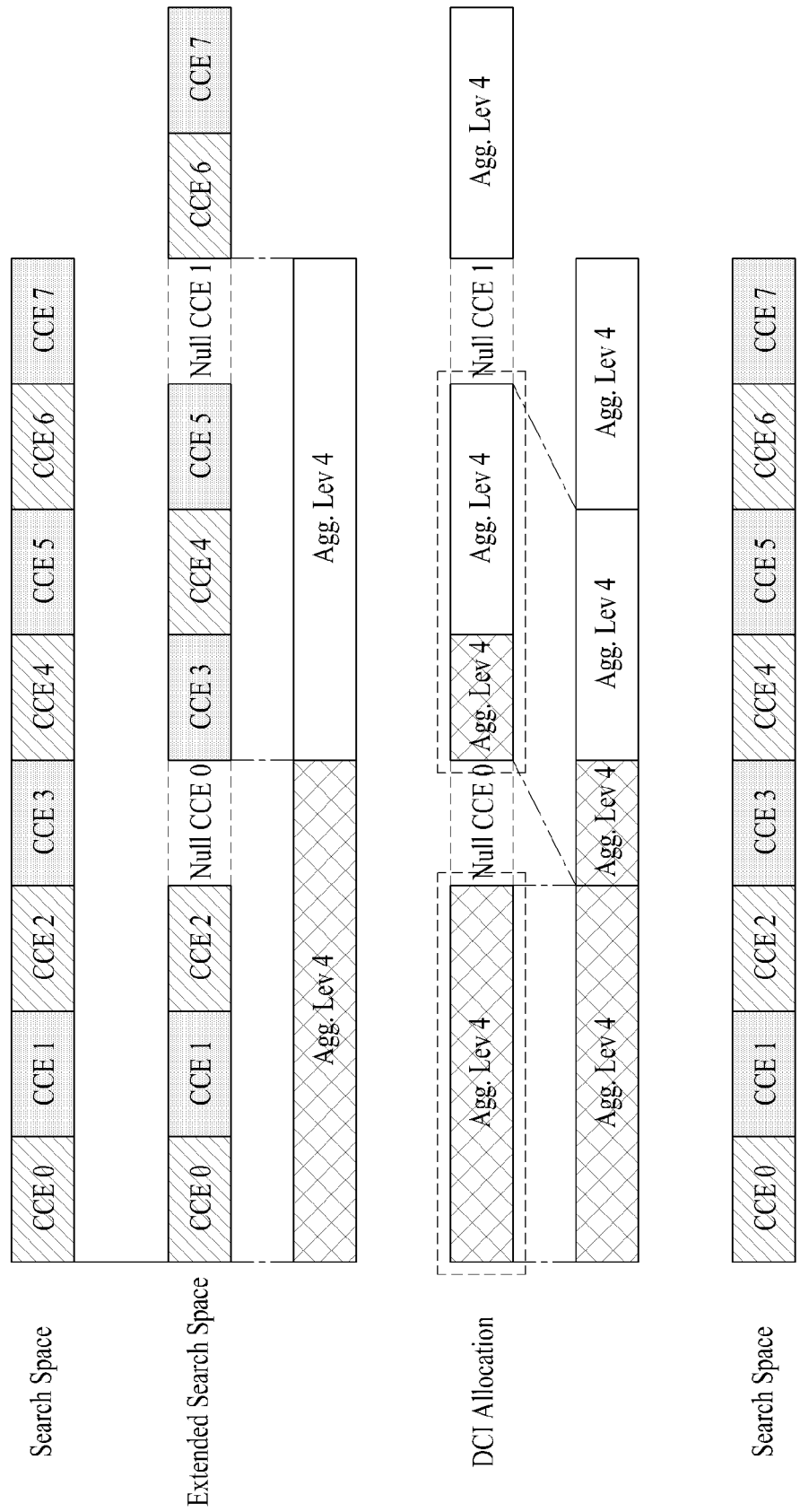
FIG. 17 illustrates a resource allocation method using a search space, which is extended from the PRB-pair being partitioned to 3 subsets according to an exemplary embodiment of the present invention.

FIG. 17 illustrates a resource allocation method using a search space, which is extended from the PRB-pair being partitioned to 3 subsets according to an exemplary embodiment of the present invention.

Referring to FIG. 17, it will be apparent that, after allocating logical E-CCEs of consecutive indexes within an extended search space, the actual search space detects the null CCE portion and performs allocation after excluding this portion.

Meanwhile, in case only 1 or 2 antenna ports are used for the DM-RS based transmission, the E-PDCCH uses 12 REs per one PRB-pair, and, when the E-PDCCH uses a larger number of antenna ports (a maximum of 4 antenna ports), all 24 REs are used. More specifically, depending upon the number of antenna ports to which the E-CCEs being partitioned in one PRB-pair are allocated, the number valid. REs may have a difference of up to 12 REs.

When 1 PRB-pair is divided into 3 subsets, and when 3 UEs are multiplexed accordingly (i.e., 1 UE per 1 E-CCE), only 2 antenna ports may be used while the UEs of 2 users can be multiplexed in one antenna port by using the SCID, or, among 4 antenna ports, 3 antenna ports may be selected and the selected antenna ports may be allocated to each user.

When 3 UEs are allocated to 2 antenna ports, although DM-RS overhead may be reduced, a more complicated rule may be applied for dividing RE resources, DM-RS, and so on. Additionally, when 3 UEs are allocated to 4 antenna ports, the DM-RS overhead is significantly increased, and 1 antenna port is wasted. Also, when allocating 3 subsets to 2 UEs or 1 UE, there may exist some complexity in allocating an E-PDCCH, which is configured of diverse Aggregation Levels.

Figure 18:
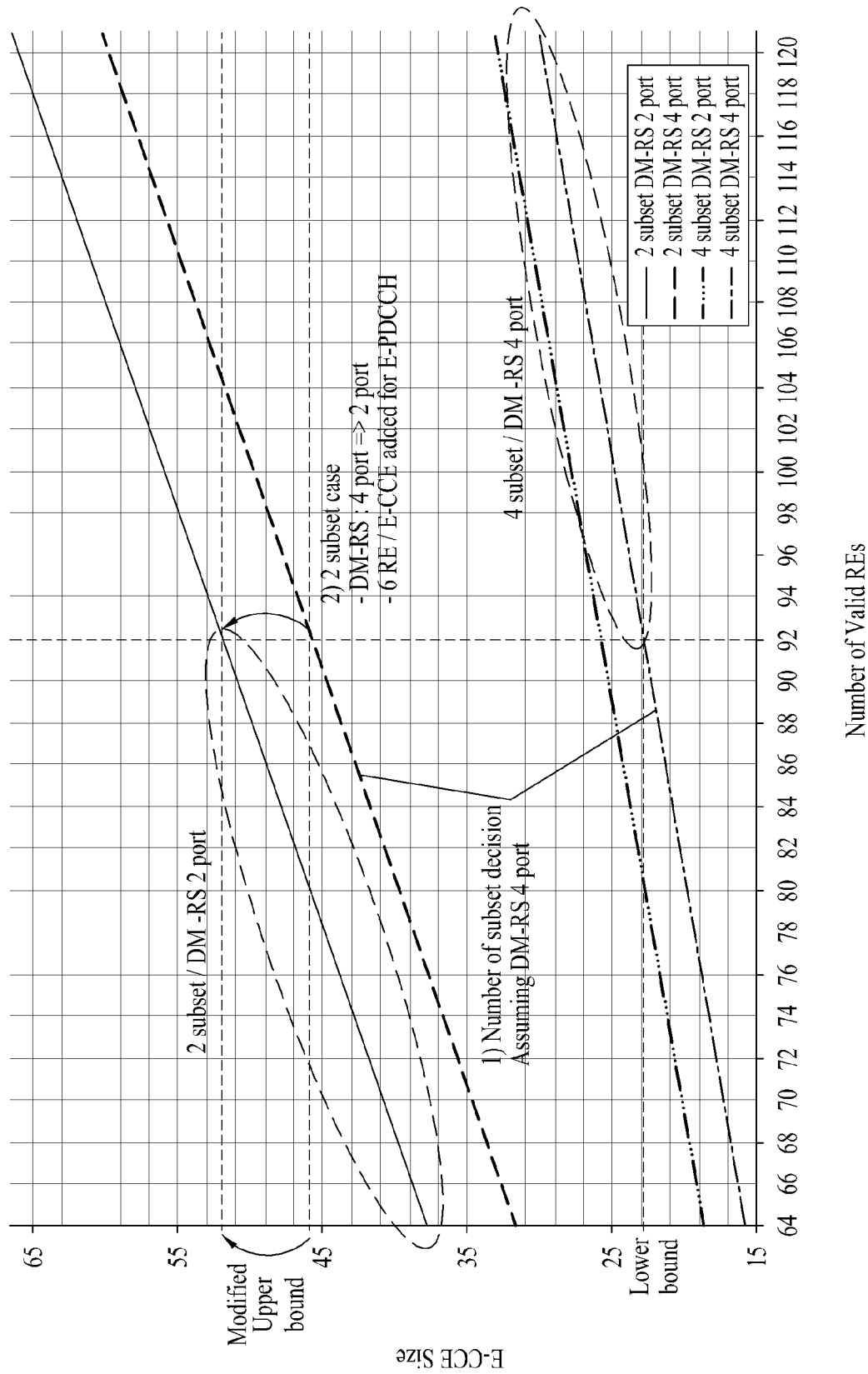
FIG. 18 illustrates a method for portioning a PRB-pair within respect to a number of DM-RS antenna ports according to an exemplary embodiment of the present invention.

FIG. 18 illustrates a method for portioning a PRB-pair within respect to a number of DM-RS antenna ports according to an exemplary embodiment of the present invention.

For the reasons that are described above, when performing actual partitioning, the process of dividing a PRB-pair into 3 subsets may be omitted, and the PRB-pair may be divided into 1, 2, and 4 subsets. However, in light of the number of subsets respective to the number of usable REs, the number of REs per 1 E-CCE varies (or changes) significantly at a point when 1 subset changes to 2 subsets and at a point when 2 subsets change to 4 subsets. In the case when 1 subset changes to 2 subsets, there is no change in the DM-RS overhead respective to the number of antenna ports.

Conversely, in the case when 2 subsets change to 4 subsets, the DM-RS overhead increases instantly, and the number of usable REs reduces significantly. At this point, as the number of REs per E-CCE reduces, the number of REs may not even reach the minimum value, which is decided as the basic settings.

Accordingly, among the given subframe configurations, the number of subsets may be decided in a state when the number of DM-RS antenna ports is fixed to 4, as shown in 1) of FIG. 18. After deciding the number of subsets to 4 subsets, 24 DM-RS specific REs are used without modification, However, when the number of subsets is decided to 2 subsets, among the 24 DM-RS specific REs, 12 REs are directly allocated to the DM-RS, and the remaining 12 REs are allocated for the E-CCE. Moreover, this value also influences the maximum value of the number of REs being allocated per E-CCE, and, as shown in 2) of FIG. 18, when the PRB-pair is divided into 2 subsets, since 6 REs are further allocated per 1 CCE, the maximum value should also be adjusted as much as this value.

Figure 19:
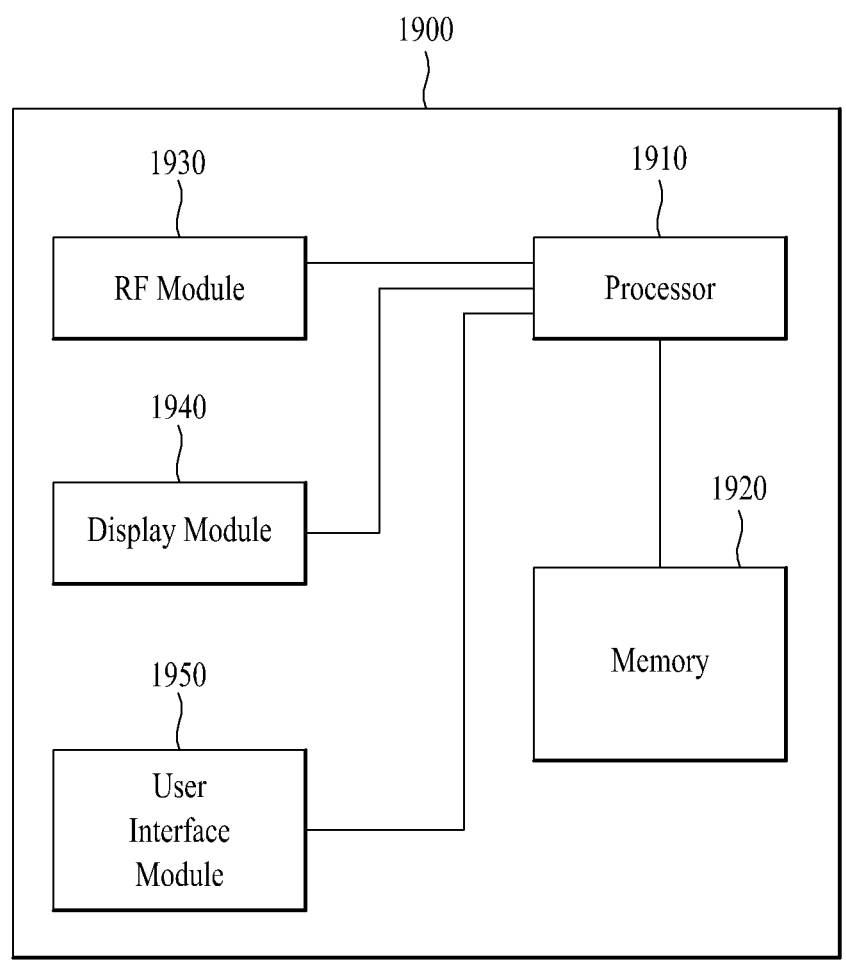
FIG. 19 illustrates a block view showing the structures of a communication device according to an exemplary embodiment of the present invention.

FIG. 19 illustrates a block view showing the structures of a communication device according to an exemplary embodiment of the present invention.

Referring to FIG. 19, a communication device (1900) includes a processor (1910), a memory (1920), an RF module (1930), a display module (1940), and a user interface module (1950).

The communication device (1900) is an exemplary illustration provided to simplify the description of the present invention. Also, the communication device (1900) may further include necessary modules. Also, in the communication device (1900), some of the modules may be divided into more segmented modules. Referring to FIG. 19, an example of the processor (1910) is configured to perform operations according to the embodiment of the present invention. More specifically, reference may be made to the description of FIG. 1 to FIG. 18 for the detailed operations of the processor (1910).

The memory (1920) is connected to the processor (1910) and stores operating systems, applications, program codes, data, and so on. The RF module (1930) is connected to the processor (1910) and performs a function of converting baseband signals to radio (or wireless) signals or converting radio signals to baseband signals. In order to do so, the RF module (1930) performs analog conversion, amplification, filtering, and frequency uplink conversion or inverse processes of the same. The display module (1940) is connected to the processor (1910) and displays diverse information. The display module (1940) will not be limited only to the example given herein. In other words, generally known elements, such as LCD (Liquid Crystal Display), LED (Light Emitting Diode), OLED (Organic Light Emitting Diode) may also be used as the display module (1940). The user interface module (1950) is connected to the processor (1910), and the user interface module (1950) may be configured of a combination of generally known user interfaces, such as keypads, touchscreens, and so on.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

As described above, the method for resource allocation for downlink control channel in a wireless communication system and the apparatus therefor have been described based upon an example that may be applied to a 3GPP LTE system. However, in addition to the 3GPP LTE system, the exemplary embodiment of the present invention may also be applied to diverse wireless communication systems.

What is claimed is:

1. A method for transmitting a downlink control channel at a base station in a wireless communication system, the method comprising:
   determining a number of usable resource elements for the downlink control channel in a data region of a resource block pair, based on a number of symbols of the data region of the resource block pair and 24 pre-configured resource elements for candidate of a demodulation reference signal (DMRS);
   determining a size of a resource allocation unit for the downlink control channel and determining a number of resource allocation units within the data region of the resource block pair, based on the determined number of usable resource elements in the data region of the resource block pair;
   allocating all of the 24 pre-configured resource elements to the DMRS, when the number of resource allocation units is determined to be 4;
   allocating 12 resource elements of the 24 pre-configured resource elements to the DMRS and 12 remaining resource elements to one or more of the resource allocation units when the number of resource allocation units is less than 4;
   mapping the downlink control channel to a transmission resource within a predetermined number of resource block pairs, in accordance with the determined number of resource allocation units and allocated resource elements for each of the resource allocation units; and
   transmitting the downlink control channel to a user equipment by using one or more antennas according to a result of the mapping of the downlink control channel,
   wherein the determined size of the resource allocation unit varies in accordance with the determined number of usable resource elements.

2. The method according to claim 1, wherein a maximum value and a minimum value of the determined size of the resource allocation unit respectively vary in accordance with the number of resource allocation units within the data region of the resource block pair.

3. The method according to claim 1, wherein unused resource elements not included in the resource allocation unit are equally distributed to the predetermined number of resource block pairs.

4. The method according to claim 3, wherein, when a number of unused resource elements is equal to R, a symbol index f(R,n) having an $n^{th}$ unused resource element located thereto is determined by Equation A as shown below:

$$f(R, n) = \left(n_{RB} + \text{round}\left(\frac{N_{Sym}}{R}\right) \cdot (n - 1)\right) \bmod N_{Sym}, \quad \langle \text{Equation A} \rangle$$

where $n_{RB}$ indicates an index of a physical resource block (PRB)-pair, $N_{Sym}$ indicates a number of symbols for the downlink control channel, and a round ( ) function returns a value of a number rounded to a nearest integer.

5. The method according to claim 1, wherein a control region in one subframe in the resource block pair includes at least one unusable resource element,
   wherein the at least one unusable resource element includes resource elements for a reference signal, and
   wherein the resource elements are included in the control region in the one subframe.

6. The method according to claim 2, wherein the maximum value is equal to or less than 46, and wherein the minimum value is equal to or greater than 23.

7. The method according to claim 1, wherein, when a plurality of resource allocation units are included in the data region of the resource block pair, the size of each of the resource allocation units is identical or has a difference equivalent to one resource element.

8. A base station device in a wireless communication system, the base station device comprising:
   a transmitter; and
   a processor operably coupled to the transmitter and configured to:
   determine a number of usable resource elements for a downlink control channel in a data region of a resource block pair based on a number of symbols of the data region of the resource block pair and 24 pre-configured resource elements for a candidate of a demodulation reference signal (DMRS);
   determine a size of a resource allocation unit for the downlink control channel and determine a number of resource allocation units within the data region of the resource block pair, based on the determined number of usable resource elements in the data region of the resource block pair,
   allocate all of the 24 pre-configured resource elements to the DMRS, when the number of resource allocation units is determined to be 4,
   allocate 12 resource elements of the 24 pre-configured resource elements to the DMRS and 12 remaining resource elements to one or more of the resource allocation units, when the number of resource allocation units is less than 4, and
   map the downlink control channel to a transmission resource within a predetermined number of resource block pairs, in accordance with the determined number of resource allocation units and allocated resource elements for each of the resource allocation units; and
   wherein the transmitter is configured to transmit the downlink control channel to a user equipment by using one or more antennas according to a result of the mapping of the downlink control channel,
wherein the determined size of the resource allocation unit varies in accordance with the determined number of usable resource elements.

9. The base station device according to claim 8, wherein a maximum value and a minimum value of the determined size of the resource allocation unit respectively vary in accordance with the number of resource allocation units within the data region of the resource block pair.

10. The base station device according to claim 8, wherein unused resource elements not included in the resource allocation unit are equally distributed to the predetermined number of resource block pairs.

11. The base station device according to claim 10, wherein, when a number of unused resource elements is equal to R, a symbol index f(R,n) having an $n^{th}$ unused resource element located thereto is determined by Equation A as shown below:

$$f(R, n) = \left(n_{RB} + \text{round}\left(\frac{N_{Sym}}{R}\right) \cdot (n - 1)\right) \bmod N_{sym}, \quad \langle \text{Equation A} \rangle$$

where $n_{RB}$ $N_{RB}$ indicates an index of a physical resource block (PRB)-pair, $N_{Sym}$ indicates a number of symbols for the downlink control channel, and a round ( ) function returns a value of a number rounded to a nearest integer.

12. The base station device according to claim 8, wherein a control region in one subframe of the resource block pair includes at least one unusable resource element,
wherein the unusable resource element includes resource elements for a reference signal, and
wherein the resource elements are included in the control region in the one subframe.

13. The base station device according to claim 9, wherein the maximum value is equal to or less than 46, and wherein the minimum value is equal to or greater than 23.

14. The base station device according to claim 8, wherein, when a plurality of resource allocation units are included in the data region of the resource block pair, the size of each of the resource allocation units is identical or has a difference equivalent to one resource element.

* * * * *